US012432076B2

(12) United States Patent
Chivers et al.

(10) Patent No.: US 12,432,076 B2
(45) Date of Patent: Sep. 30, 2025

(54) PROVISIONING HOSTS WITH OPERATOR ACCOUNTS FOR USE BY CLIENTS TO ACCESS TARGET RESOURCES

(71) Applicant: Oracle International Corporation, Redwood Shores, CA (US)

(72) Inventors: Doug Chivers, Hereford (GB); Jeremiah David Small, Wesford, MA (US); Matías Brutti, Seattle, WA (US)

(73) Assignee: Oracle International Corporation, Redwood Shores, CA (US)

( * ) Notice: Subject to any disclaimer, the term of this patent is extended or adjusted under 35 U.S.C. 154(b) by 152 days.

(21) Appl. No.: 18/493,390

(22) Filed: Oct. 24, 2023

(65) Prior Publication Data

US 2025/0132931 A1 Apr. 24, 2025

(51) Int. Cl.
*H04L 9/40* (2022.01)
*H04L 9/32* (2006.01)

(52) U.S. Cl.
CPC .......... *H04L 9/3268* (2013.01); *H04L 9/3247* (2013.01); *H04L 63/102* (2013.01)

(58) Field of Classification Search
CPC .... H04L 9/3268; H04L 9/3247; H04L 63/102
See application file for complete search history.

(56) References Cited

U.S. PATENT DOCUMENTS

| | | | |
|---|---|---|---|
| 5,671,279 A * | 9/1997 | Elgamal | H04L 63/12 705/75 |
| 5,699,431 A | 12/1997 | Van Oorschot et al. | |
| 7,272,714 B2 | 9/2007 | Nagaratnam et al. | |
| 7,644,270 B1 | 1/2010 | Cherukumudi et al. | |
| 8,176,328 B2 | 5/2012 | Chen et al. | |

(Continued)

FOREIGN PATENT DOCUMENTS

| | | |
|---|---|---|
| CN | 112019477 A | 12/2020 |
| CN | 114884963 A | 8/2022 |

(Continued)

OTHER PUBLICATIONS

"About Azure Key Vault certificates", Retrieved from https://learn.microsoft.com/en-us/azure/key-vault/certificates/about-certificates, Feb. 8, 2023, pp. 1-8.

(Continued)

*Primary Examiner* — Ghodrat Jamshidi
(74) *Attorney, Agent, or Firm* — Invoke

(57) ABSTRACT

A system includes a host network entity associated with a computing network. The host network entity may establish a first connection with a client network entity via a provisioner account in response to a connection request from a client network entity. The host network entity may receive a digital certificate from the client network entity via the first connection. The digital certificate may include an instruction set with a first instruction to generate an operator account for the client network entity. The host network entity may perform a validation of the digital certificate and the instruction set based on a public key associated with a certificate authority that is trusted by the host network entity, and responsive to the validation, the host network entity may generate the operator account based on the first instruction and establish a second connection with the client network entity via the operator account.

20 Claims, 9 Drawing Sheets

(56) References Cited

U.S. PATENT DOCUMENTS

| | | |
|---|---|---|
| 8,452,958 B2 | 5/2013 | Sun et al. |
| 9,172,543 B2 | 10/2015 | Wnuk |
| 9,197,630 B2 | 11/2015 | Sharif et al. |
| 9,231,933 B1 | 1/2016 | Shenoy et al. |
| 9,485,101 B2 | 11/2016 | Bowen |
| 9,660,978 B1 | 5/2017 | Truskovsky et al. |
| 9,680,813 B2 | 6/2017 | Sade et al. |
| 9,794,249 B1 | 10/2017 | Truskovsky et al. |
| 9,882,727 B1 | 1/2018 | Veladanda et al. |
| 10,021,084 B2 | 7/2018 | Matthews et al. |
| 10,212,147 B2 | 2/2019 | Buendgen et al. |
| 10,621,577 B2 | 4/2020 | Castinado et al. |
| 10,652,030 B1 | 5/2020 | Levy et al. |
| 10,764,263 B2 | 9/2020 | Rossi |
| 10,771,261 B1 | 9/2020 | Lazar et al. |
| 10,812,276 B2 | 10/2020 | Bojjireddy et al. |
| 10,848,323 B2 | 11/2020 | Barr, III et al. |
| 11,153,103 B2 | 10/2021 | Fynaardt et al. |
| 11,196,570 B2 | 12/2021 | Borne-Pons et al. |
| 11,310,059 B2 | 4/2022 | Leibmann et al. |
| 11,362,843 B1 | 6/2022 | Jiang et al. |
| 11,368,314 B2 | 6/2022 | Ray et al. |
| 11,388,594 B2 | 7/2022 | Uy et al. |
| 11,438,325 B2 | 9/2022 | Begun et al. |
| 11,627,123 B2 | 4/2023 | Stayskal et al. |
| 11,706,038 B1 | 7/2023 | Thakore et al. |
| 11,888,997 B1 | 1/2024 | Bowen et al. |
| 12,088,738 B2 | 9/2024 | Rosenthol et al. |
| 2002/0007346 A1 | 1/2002 | Qiu et al. |
| 2002/0174066 A1 | 11/2002 | Kleckner et al. |
| 2003/0037234 A1 | 2/2003 | Fu et al. |
| 2006/0047965 A1 | 3/2006 | Thayer |
| 2006/0101510 A1 | 5/2006 | Kadyk et al. |
| 2007/0005956 A1 | 1/2007 | Zilinskas et al. |
| 2007/0016782 A1* | 1/2007 | Crall .................... H04L 9/3263 |
| | | 713/175 |
| 2007/0147619 A1 | 6/2007 | Bellows et al. |
| 2010/0030897 A1 | 2/2010 | Stradling |
| 2010/0325429 A1 | 12/2010 | Saha et al. |
| 2011/0113239 A1 | 5/2011 | Fu et al. |
| 2012/0036220 A1 | 2/2012 | Dare et al. |
| 2012/0240192 A1 | 9/2012 | Orazi et al. |
| 2012/0246466 A1 | 9/2012 | Salvarani et al. |
| 2012/0278614 A1 | 11/2012 | Choi |
| 2013/0086642 A1 | 4/2013 | Resch et al. |
| 2014/0298419 A1 | 10/2014 | Boubez et al. |
| 2015/0135299 A1 | 5/2015 | Liang et al. |
| 2015/0215308 A1* | 7/2015 | Manolov ............. H04L 67/1036 |
| | | 709/229 |
| 2015/0279132 A1* | 10/2015 | Perotti ................ G07C 9/00563 |
| | | 340/5.52 |
| 2016/0277923 A1* | 9/2016 | Steffey .................. H04W 12/04 |
| 2017/0039373 A1 | 2/2017 | Sasin et al. |
| 2017/0126667 A1 | 5/2017 | Bishop et al. |
| 2017/0171191 A1 | 6/2017 | Cignetti et al. |
| 2017/0279807 A1 | 9/2017 | Bermudez |
| 2017/0317837 A1 | 11/2017 | Alrawais et al. |
| 2017/0338967 A1 | 11/2017 | Lewison et al. |
| 2018/0083966 A1 | 3/2018 | Zhou et al. |
| 2018/0102904 A1 | 4/2018 | Lin et al. |
| 2018/0287804 A1 | 10/2018 | Geisbush |
| 2019/0026804 A1* | 1/2019 | Yin ..................... G06Q 20/3221 |
| 2019/0149342 A1 | 5/2019 | Fynaardt et al. |
| 2019/0165950 A1 | 5/2019 | Ibrahim |
| 2019/0166635 A1* | 5/2019 | McColgan ............ H04W 12/50 |
| 2019/0347406 A1 | 11/2019 | Lev-Ran |
| 2019/0349402 A1 | 11/2019 | Shukla et al. |
| 2019/0356817 A1 | 11/2019 | Bush et al. |
| 2019/0363895 A1 | 11/2019 | Barr et al. |
| 2019/0372783 A1* | 12/2019 | Martinez ............... H04L 9/3268 |
| 2020/0021575 A1 | 1/2020 | Rezvani et al. |
| 2020/0092095 A1 | 3/2020 | Yang et al. |
| 2020/0150972 A1 | 5/2020 | Ketkar et al. |
| 2020/0274718 A1 | 8/2020 | Hwang et al. |
| 2020/0274862 A1 | 8/2020 | Varvarezis et al. |
| 2020/0396089 A1* | 12/2020 | Guo ..................... H04L 63/123 |
| 2021/0034767 A1 | 2/2021 | Free et al. |
| 2021/0126801 A1 | 4/2021 | Nix |
| 2021/0152547 A1 | 5/2021 | Barhudarian et al. |
| 2021/0211307 A1 | 7/2021 | Statia et al. |
| 2021/0218723 A1 | 7/2021 | Lekov et al. |
| 2021/0392002 A1 | 12/2021 | Gray et al. |
| 2021/0409403 A1 | 12/2021 | Lewin et al. |
| 2021/0409409 A1 | 12/2021 | Palanisamy |
| 2022/0014522 A1 | 1/2022 | Thomas et al. |
| 2022/0038894 A1 | 2/2022 | Yoon et al. |
| 2022/0123951 A1 | 4/2022 | Lutz et al. |
| 2022/0150238 A1 | 5/2022 | Bhalerao |
| 2022/0239503 A1 | 7/2022 | Mallikarjuna et al. |
| 2022/0393886 A1 | 12/2022 | Williams et al. |
| 2023/0007474 A1 | 1/2023 | Ni et al. |
| 2023/0032867 A1 | 2/2023 | Peddada et al. |
| 2023/0062888 A1 | 3/2023 | Colombano |
| 2023/0109231 A1 | 4/2023 | Adogla et al. |
| 2023/0121514 A1* | 4/2023 | Smith ................... G06F 16/214 |
| | | 707/626 |
| 2023/0208655 A1 | 6/2023 | Statia et al. |
| 2023/0237155 A1 | 7/2023 | Jacquin et al. |
| 2023/0291574 A1 | 9/2023 | Held et al. |
| 2023/0291577 A1 | 9/2023 | Thai et al. |
| 2023/0401307 A1 | 12/2023 | Pop et al. |
| 2023/0412397 A1 | 12/2023 | Gollent et al. |
| 2024/0015508 A1 | 1/2024 | Yoon et al. |
| 2024/0020373 A1 | 1/2024 | Ivanov et al. |
| 2024/0031146 A1 | 1/2024 | Marosi-Bauer et al. |
| 2024/0106886 A1 | 3/2024 | Roy et al. |
| 2024/0121603 A1 | 4/2024 | Yoon et al. |
| 2024/0146543 A1 | 5/2024 | Sahoo et al. |
| 2024/0333640 A1 | 10/2024 | Shevade et al. |
| 2024/0356763 A1 | 10/2024 | Goldberg et al. |
| 2024/0388510 A1 | 11/2024 | Madtha et al. |
| 2025/0030561 A1 | 1/2025 | Long et al. |
| 2025/0088373 A1 | 3/2025 | Uzun et al. |
| 2025/0097211 A1 | 3/2025 | Uzun et al. |
| 2025/0133401 A1 | 4/2025 | Lee et al. |

FOREIGN PATENT DOCUMENTS

| | | |
|---|---|---|
| EP | 1251670 A2 | 10/2002 |
| EP | 2267970 A2 | 12/2010 |
| EP | 2854349 A1 | 4/2015 |
| EP | 3772208 B1 | 9/2024 |
| KR | 10-2011-0045459 A | 5/2011 |
| WO | 2006/122024 A2 | 11/2006 |
| WO | 2022/121461 A1 | 6/2022 |
| WO | 2022/133026 A1 | 6/2022 |
| WO | 2023/240360 A1 | 12/2023 |
| WO | 2025/059187 A1 | 3/2025 |

OTHER PUBLICATIONS

"About the Expressway", Aug. 17, 2022. pp. 1-12.

"Automated certificate management for TLS certificates", Retrieved from https://docs.servicenow.com/en-US/bundle/utah-it-operations-management/page/product/discovery/concept/automated-cert-requests.html, Retrieved on May 4, 2023, pp. 1-4.

"AWS Certificate Manager FAQs", Retrieved from https://aws.amazon.com/certificate-manager/faqs/, Retrieved on Mar. 24, 2023, pp. 1-17.

"Azure Instance Metadata Service", Retrieved from https://learn.microsoft.com/en-us/azure/virtual-machines/instance-metadata-service?tabs=windows, Mar. 15, 2023, pp. 1-42.

"Cisco Expressway Certificate Creation and Use Deployment Guide", Feb. 23, 2021, pp. 10.

"Deploying the CA bundle iApp", Retrieved from https://www.f5.com/pdf/deployment-guides/f5-ca-bundle-dg.pdf, Dec. 14, 2017, pp. 1-9.

"DigiCert Public Key Infrastructure (PKI) Platform", 2019, pp. 15.

"Get started with Key Vault certificates", Retrieved from https://learn.microsoft.com/en-us/azure/key-vault/certificates/certificate-scenarios, Retrieved on Feb. 1, 2023, pp. 1-6.

(56) References Cited

OTHER PUBLICATIONS

"High Availability using Patching and Rolling AP Upgrade on Cisco Catalyst 9800 Wireless Controllers", Copyright 2020, pp. 1-41.
"Manage Certificate Revocation Lists (CRLs)", Jul. 23, 2021, pp. 1-4.
"PKI secrets engine", Retrieved from https://developer.hashicorp.com/vault/docs/secrets/pki, Retrieved on May 4, 2023, pp. 1-3.
"Planning a certificate revocation list (CRL)", Retrieved from https://docs.aws.amazon.com/privateca/latest/userguide/crl-planning.html, Retrieved on Jul. 28, 2023, pp. 11.
"Release app updates with staged rollouts", Retrieved from https://support.google.com/googleplay/android-developer/answer/6346149?hl=en#zippy=%2Crelease-a-staged-rollout-to-specific-countries, Retrieved on Apr. 27, 2023, pp. 1-2.
"Release Your App Update in a Staged Rollout", Retrieved from https://developer.amazon.com/docs/app-submission/release-updates-in-staged-rollouts.html, Retrieved on Apr. 27, 2023, pp. 1-18.
"Rotate Security Certificates", Retrieved from https://www.cockroachlabs.com/docs/stable/rotate-certificates, Retrieved on May 4, 2023, pp. 1-6.
"Rotating the Root CA and Leaf Certificates", Retrieved from https://docs.pivotal.io/ops-manager/2-4/security/pcf-infrastructure/rotate-cas-and-leaf-certs.html, Nov. 5, 2020, pp. 1-9.
"Staged upgrade", Retrieved from https://www.ibm.com/docs/en/order-management-sw/9.4.0?topic=migrating-staged-upgrade, Mar. 2, 2021, pp. 1-3.
"Troubleshoot SSL certificates", Retrieved from https://cloud.google.com/load-balancing/docs/ssl-certificates/troubleshooting, Retrieved on Mar. 24, 2023, pp. 1-8.
"Tutorial: Configure certificate auto-rotation in Key Vault", Retrieved from https://learn.microsoft.com/en-us/azure/key-vault/certificates/tutorial-rotate-certificates, Feb. 27, 2023, pp. 1-6.
"Updating the CA bundle", Retrieved from https://docs.openshift.com/container-platform/4.9/security/certificates/updating-ca-bundle.html#ca-bundle-understanding_updating-ca-bundle, Retrieved on Mar. 24, 2023, pp. 1-2.
"Updating your private CA", Retrieved from https://docs.aws.amazon.com/privateca/latest/userguide/PCAUpdateCA.html, Retrieved on Mar. 24, 2023, pp. 1-4.
"Use self-managed SSL certificates", Retrieved from https://cloud.google.com/load-balancing/docs/ssl-certificates/self-managed-certs, Aug. 15, 2023, pp. 13.
"vSphere Security", vmware, Update 3, Mar. 21, 2023, pp. 1-426.
"Working with Hosts", Retrieved from https://docs.cloudstack.apache.org/projects/archived-cloudstack-administration/en/latest/hosts.html, Retrieved on Mar. 24, 2023, pp. 1-7.
Atutxa et al., "Improving efficiency and security of IIoT communications using in-network validation of server certificate", Computers in Industry, vol. 144, Jan. 2023, 103802, pp. 30.
Bigelow S.J., "Rolling deployment", Retrieved from https://www.techtarget.com/searchitoperations/definition/rolling-deployment, Jan. 2023, pp. 4.
Este-Gracias S., "Rotate your CA seamlessly using a Vault PKI", Retrieved from https://sestegra.medium.com/rotate-your-ca-seamlessly-using-a-vault-pki-9262228b4afb Sep. 29, 2022, pp. 1-49.
Ghanmi et al., "A Secure Data Storage in Multi-cloud Architecture Using Blowfish Encryption Algorithm", Advanced Information Networking and Applications, Mar. 2022, pp. 398-408.
Jamal F., "Zero Trust for SSH—Secure One-click Server Access for Software Engineering Teams", Retrieved from https://www.banyansecurity.io/blog/zero-trust-for-ssh/, Oct. 28, 2020, pp. 1-7.
Manjusha R. et al., "Secure Authentication and Access System for Cloud Computing Auditing Services Using Associated Digital Certificate", Indian Journal of Science and Technology, vol. 8 (S7), Apr. 2015, pp. 220-227.
Nexthop Team, "Updated: Creating a Certificate Revocation List Distribution Point for Your Internal Certification Authority", Retrieved from https://techcommunity.microsoft.com/t5/skype-for-business-blog/updated-creating-a-certificate-revocation-list-distribution/ba-p/620691, Dec. 17, 2012, pp. 10.
Rowley J., "Google's Moving Forward Together Proposals for Root CA Policy: Rotating ICAS More Frequently", Retrieved from https://www.digicert.com/blog/googles-moving-forward-together-proposals-for-root-ca-policy, Mar. 22, 2023, pp. 1-11.
Subhayu, "Different Phases of a Certificate Lifecycle Management Process for a secure WPA2-Enterprise network", Certificate Lifecycle Management Oct. 6, 2022, pp. 16.
Ylonen et al., "Security of Automated Access Management Using Secure Shell (SSH)", National Institute of Standards and Technology Interagency or Internal Report 7966, Aug. 2014, pp. 43.
"What is Certificate Lifecycle Management", Retrieved from https://www.encryptionconsulting.com/different-phases-of-a-certificate-lifecycle-management-process/, Aug. 1, 2024, pp. 1-12.

* cited by examiner

PROVISIONING HOSTS WITH OPERATOR ACCOUNTS FOR USE BY CLIENTS TO ACCESS TARGET RESOURCES

TECHNICAL FIELD

The present disclosure relates to accessing target resources on computing networks. More particularly, the present disclosure relates to provisioning hosts with operator accounts that can be used by a client to access the target resources.

BACKGROUND

Clients may access target resources on a computing network via a host. A client may initiate a request to access a target resource. The request may be routed to the host that manages access to the target resources. The host may validate that the client is authorized to access the target resources by confirming that the client's identity corresponds to one or more access policies that allow for access to the target resources. Once the client's authorization to access the target resources is confirmed, a connection is established for the client to access the target resources.

The content of this background section should not be construed as prior art merely by virtue of its presence in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
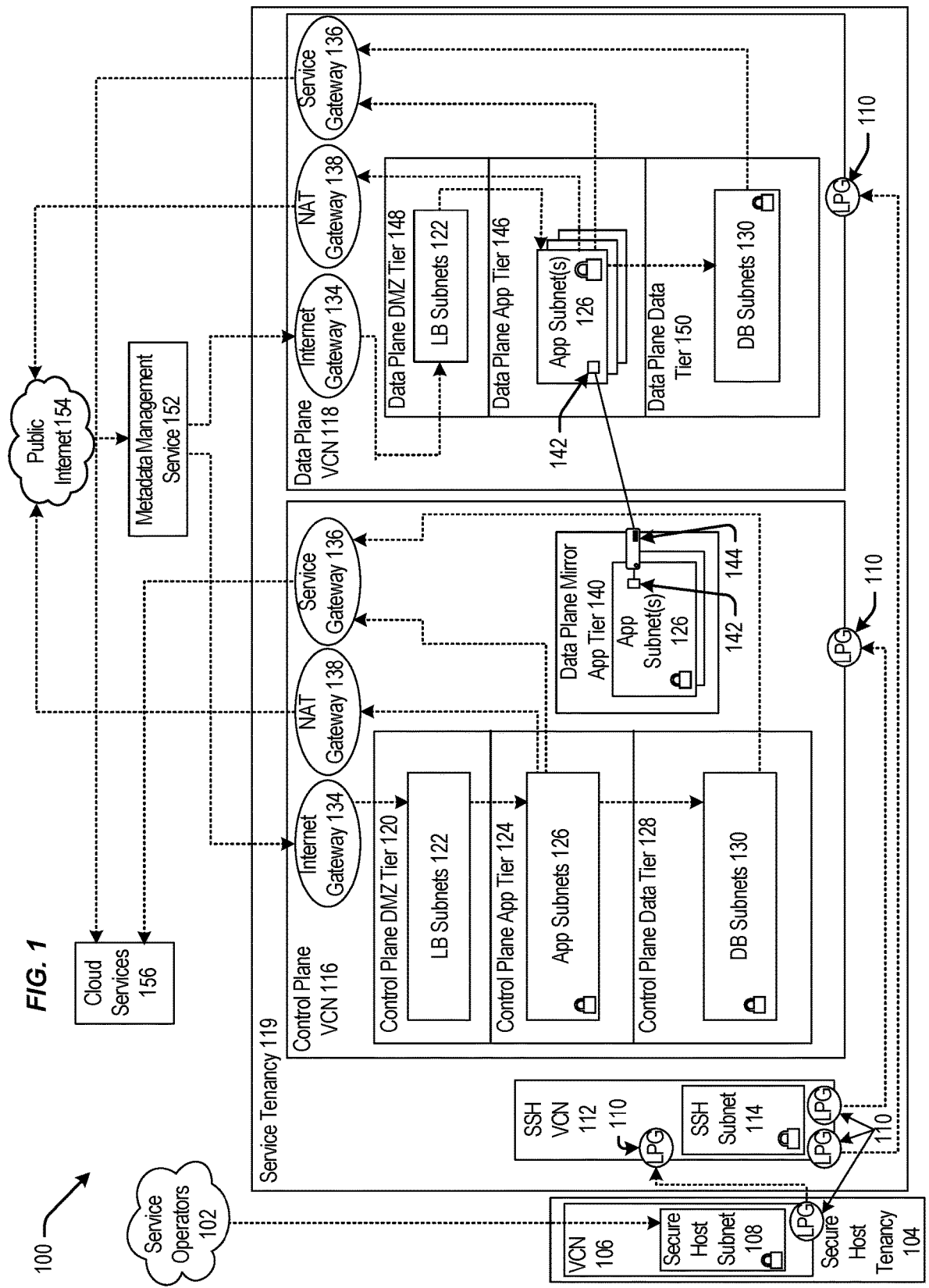
FIGS. 1-4 are block diagrams illustrating patterns for implementing a cloud infrastructure as a service system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. DEFINITIONS
3. CLOUD COMPUTING TECHNOLOGY
4. COMPUTER SYSTEM
5. ARCHITECTURAL OVERVIEW
6. GENERATING OPERATOR ACCOUNTS
7. ESTABLISHING OPERATOR ACCOUNT CONNECTIONS
8. MISCELLANEOUS; EXTENSIONS

1. General Overview

One or more embodiments validate and execute instructions comprised in a digital certificate to generate an operator account for establishing a connection with a client network entity. The operator account can be utilized by the client network entity to access one or more target resources. The digital certificate may identify two user principals that are authorized to connect to a host network entity: a provisioner user and an operator user. The provisioner user is an alias of the client network entity used to connect to the host network entity via a provisioner account for the limited purpose of requesting the host network entity to generate the operator account. The provisioner account is an account that has limited permissions, such that, via the provisioner account, the host network entity can only execute operations associated with generating the operator account. The operator user is an alias of the client network entity used to connect to the host network entity via the operator account for the purpose of accessing the target resources via the host network entity. The operator account has permissions that allow the client network entity to access and use the target resources. Conversely, the permissions associated with the provisioner account do not allow the client network entity to access or use the target resources.

In one example, when the client network entity connects to the host network entity via the provisioner account, the client network entity presents a digital certificate to the host network entity that includes metadata containing instructions that are executable by the host network entity to generate the operator account. The metadata containing the instructions may be digitally signed by a certificate authority (CA) that is trusted by the host network entity. The host network entity validates the digital signature using the CA's public key, and responsive to successfully validating the digital signature, the host network entity creates the operator account based on the executable instructions in the digital certificate, and then terminates the connection that was established with the client network entity via the provisioner account. Subsequently, the client network entity connects to the host network entity using the operator account generated by the host network entity, and the client network entity accesses and utilizes the target resources via the operator account.

One or more embodiments described in this Specification and/or recited in the claims may not be included in this General Overview section.

2. Definitions

As used herein, the term "on-premises network" refers to a network infrastructure or device that is located and operated within a physical premises or data center of a customer.

As used herein, the term "customer" refers to a third-party that receives services from a service provider.

As used herein, the term "service provider" refers to a provider of computing infrastructure services, such as an Infrastructure as a Service and/or one or more target resources located on a service provider infrastructure. The term "service provider" includes "cloud providers" that provide cloud computing infrastructure services, such as an Infrastructure as a Service and/or one or more target resources located on a cloud provider infrastructure.

As used herein, the term "multi-cloud environment" refers to a cloud computing strategy in which an organization uses and integrates services and resources from multiple cloud providers. In a multi-cloud environment, an organization may simultaneously utilize the infrastructure, platform, or software services of two or more cloud providers, rather than relying on a single cloud provider for all its cloud needs. Additionally, or in the alternative, in a multi-cloud environment, a first cloud provider may be a customer or a client with respect to a second cloud provider.

As used herein, the term "network entity" refers to a device, component, or element within a computer network and/or computing infrastructure. A network entity may be implemented in hardware and/or software. A network entity may include a host network entity or a client network entity.

As used herein, the term "host network entity" or "host" refers to a network entity that provides access to target resources, such as cloud resources on a cloud computing network.

As used herein, the term "client network entity" or "client" refers to a network entity that accesses target resources via a host, such as cloud resources on a cloud computing network. A client may be associated with a customer, or a service provider.

As used herein, the term "asymmetric key pair" refers to a public key and a private key that are associated with one another, such that a digital signature or an encryption generated using the private key may be validated or decrypted using the public key.

As used herein, the term "certificate authority" or "CA" refers to an entity that issues digital certificates.

As used herein, the term "digital certificate" refers to a digitally signed electronic document that binds a public key to the identity of an entity or certificate holder. The entity or certificate holder may hold a private key corresponding to the public key. The public key may be included in or associated with the digital certificate. The digital certificate may be validated by matching the public key to the private key through the use of cryptography. A digital certificate may conform to International Telecommunication Union standard X.509. A digital certificate may include an issuer's name, a certificate holder's name, a public key, issuer (CA) information, and expiration date. Digital certificates may be used in various security protocols, such as SSL/TLS, to establish the identity and authenticity of the communicating parties and facilitate secure communication.

3. Cloud Computing Technology

Infrastructure as a Service (IaaS) is an application of cloud computing technology. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (example services include billing software, monitoring software, logging software, load balancing software, clustering software, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In some cases, a cloud computing model will involve the participation of a cloud provider. The cloud provider may, but need not be, a third-party service that specializes in providing (e.g., offering, renting, selling) IaaS. An entity may also opt to deploy a private cloud, becoming its own provider of infrastructure services.

In some examples, IaaS deployment is the process of implementing a new application, or a new version of an application, onto a prepared application server or other similar device. IaaS deployment may also include the process of preparing the server (e.g., installing libraries, daemons, etc.). The deployment process is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are challenges for IaaS provisioning. There is an initial challenge of provisioning the initial set of infrastructure. There is an additional challenge of evolving the existing infrastructure (e.g., adding new services, changing services, removing services, etc.) after the initial provisioning is completed. In some cases, these challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). In some embodiments, infrastructure and resources may be provisioned (manually, and/or using a provisioning tool) prior to deployment of code to be executed on the infrastructure. However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

FIG. 1 is a block diagram illustrating an example pattern of an IaaS architecture 100, according to at least one embodiment. Service operators 102 can be communicatively coupled to a secure host tenancy 104 that can include a virtual cloud network (VCN) 106 and a secure host subnet 108. In some examples, the service operators 102 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 106 and/or the Internet.

The VCN 106 can include a local peering gateway (LPG) 110 that can be communicatively coupled to a secure shell (SSH) VCN 112 via an LPG 110 contained in the SSH VCN 112. The SSH VCN 112 can include an SSH subnet 114, and the SSH VCN 112 can be communicatively coupled to a control plane VCN 116 via the LPG 110 contained in the control plane VCN 116. Also, the SSH VCN 112 can be communicatively coupled to a data plane VCN 118 via an LPG 110. The control plane VCN 116 and the data plane VCN 118 can be contained in a service tenancy 119 that can be owned and/or operated by the IaaS provider.

The control plane VCN 116 can include a control plane demilitarized zone (DMZ) tier 120 that acts as a perimeter network (e.g., portions of a corporate network between the corporate intranet and external networks). The DMZ-based servers may have restricted responsibilities and help keep breaches contained. Additionally, the DMZ tier 120 can include one or more load balancer (LB) subnet(s) 122, a control plane app tier 124 that can include app subnet(s) 126, a control plane data tier 128 that can include database (DB) subnet(s) 130 (e.g., frontend DB subnet(s) and/or backend DB subnet(s)). The LB subnet(s) 122 contained in the control plane DMZ tier 120 can be communicatively coupled to the app subnet(s) 126 contained in the control plane app tier 124 and an Internet gateway 134 that can be contained in the control plane VCN 116, and the app subnet(s) 126 can be communicatively coupled to the DB subnet(s) 130 contained in the control plane data tier 128 and a service gateway 136 and a network address translation (NAT) gateway 138. The control plane VCN 116 can include the service gateway 136 and the NAT gateway 138.

The control plane VCN 116 can include a data plane mirror app tier 140 that can include app subnet(s) 126. The app subnet(s) 126 contained in the data plane mirror app tier 140 can include a virtual network interface controller (VNIC) 142 that can execute a compute instance 144. The compute instance 144 can communicatively couple the app subnet(s) 126 of the data plane mirror app tier 140 to app subnet(s) 126 that can be contained in a data plane app tier 146.

The data plane VCN 118 can include the data plane app tier 146, a data plane DMZ tier 148, and a data plane data tier 150. The data plane DMZ tier 148 can include LB subnet(s) 122 that can be communicatively coupled to the app subnet(s) 126 of the data plane app tier 146 and the Internet gateway 134 of the data plane VCN 118. The app subnet(s) 126 can be communicatively coupled to the service gateway 136 of the data plane VCN 118 and the NAT gateway 138 of the data plane VCN 118. The data plane data tier 150 can also include the DB subnet(s) 130 that can be communicatively coupled to the app subnet(s) 126 of the data plane app tier 146.

The Internet gateway 134 of the control plane VCN 116 and of the data plane VCN 118 can be communicatively coupled to a metadata management service 152 that can be communicatively coupled to public Internet 154. Public Internet 154 can be communicatively coupled to the NAT gateway 138 of the control plane VCN 116 and of the data plane VCN 118. The service gateway 136 of the control plane VCN 116 and of the data plane VCN 118 can be communicatively couple to cloud services 156.

In some examples, the service gateway 136 of the control plane VCN 116 or of the data plane VCN 118 can make application programming interface (API) calls to cloud services 156 without going through public Internet 154. The API calls to cloud services 156 from the service gateway 136 can be one-way: the service gateway 136 can make API calls to cloud services 156, and cloud services 156 can send requested data to the service gateway 136. But, cloud services 156 may not initiate API calls to the service gateway 136.

In some examples, the secure host tenancy 104 can be directly connected to the service tenancy 119, which may be otherwise isolated. The secure host subnet 108 can communicate with the SSH subnet 114 through an LPG 110 that may enable two-way communication over an otherwise isolated system. Connecting the secure host subnet 108 to the SSH subnet 114 may give the secure host subnet 108 access to other entities within the service tenancy 119.

The control plane VCN 116 may allow users of the service tenancy 119 to set up or otherwise provision desired resources. Desired resources provisioned in the control plane VCN 116 may be deployed or otherwise used in the data plane VCN 118. In some examples, the control plane VCN 116 can be isolated from the data plane VCN 118, and the data plane mirror app tier 140 of the control plane VCN 116 can communicate with the data plane app tier 146 of the data plane VCN 118 via VNICs 142 that can be contained in the data plane mirror app tier 140 and the data plane app tier 146.

In some examples, users of the system, or customers, can make requests, for example create, read, update, or delete (CRUD) operations, through public Internet 154 that can communicate the requests to the metadata management service 152. The metadata management service 152 can communicate the request to the control plane VCN 116 through the Internet gateway 134. The request can be received by the LB subnet(s) 122 contained in the control plane DMZ tier 120. The LB subnet(s) 122 may determine that the request is valid, and in response to this determination, the LB subnet(s) 122 can transmit the request to app subnet(s) 126 contained in the control plane app tier 124. If the request is validated and requires a call to public Internet 154, the call to public Internet 154 may be transmitted to the NAT gateway 138 that can make the call to public Internet 154. Metadata that may be desired to be stored by the request can be stored in the DB subnet(s) 130.

In some examples, the data plane mirror app tier 140 can facilitate direct communication between the control plane VCN 116 and the data plane VCN 118. For example, changes, updates, or other suitable modifications to configuration may be desired to be applied to the resources contained in the data plane VCN 118. Via a VNIC 142, the control plane VCN 116 can directly communicate with, and can thereby execute the changes, updates, or other suitable modifications to configuration to, resources contained in the data plane VCN 118.

In some embodiments, the control plane VCN 116 and the data plane VCN 118 can be contained in the service tenancy 119. In this case, the user, or the customer of the system may not own or operate either the control plane VCN 116 or the data plane VCN 118. Instead, the IaaS provider may own or operate the control plane VCN 116 and the data plane VCN 118, both of which may be contained in the service tenancy 119. This embodiment can enable isolation of networks that may prevent users or customers from interacting with other users', or other customers', resources. Also, this embodiment may allow users or customers of the system to store databases privately without needing to rely on public Internet 154, which may not have a desired level of threat prevention, for storage.

In other embodiments, the LB subnet(s) 122 contained in the control plane VCN 116 can be configured to receive a signal from the service gateway 136. In this embodiment, the control plane VCN 116 and the data plane VCN 118 may be configured to be called by a customer of the IaaS provider without calling public Internet 154. Customers of the IaaS provider may desire this embodiment since database(s) that the customers use may be controlled by the IaaS provider and may be stored on the service tenancy 119, which may be isolated from public Internet 154.

Figure 2:
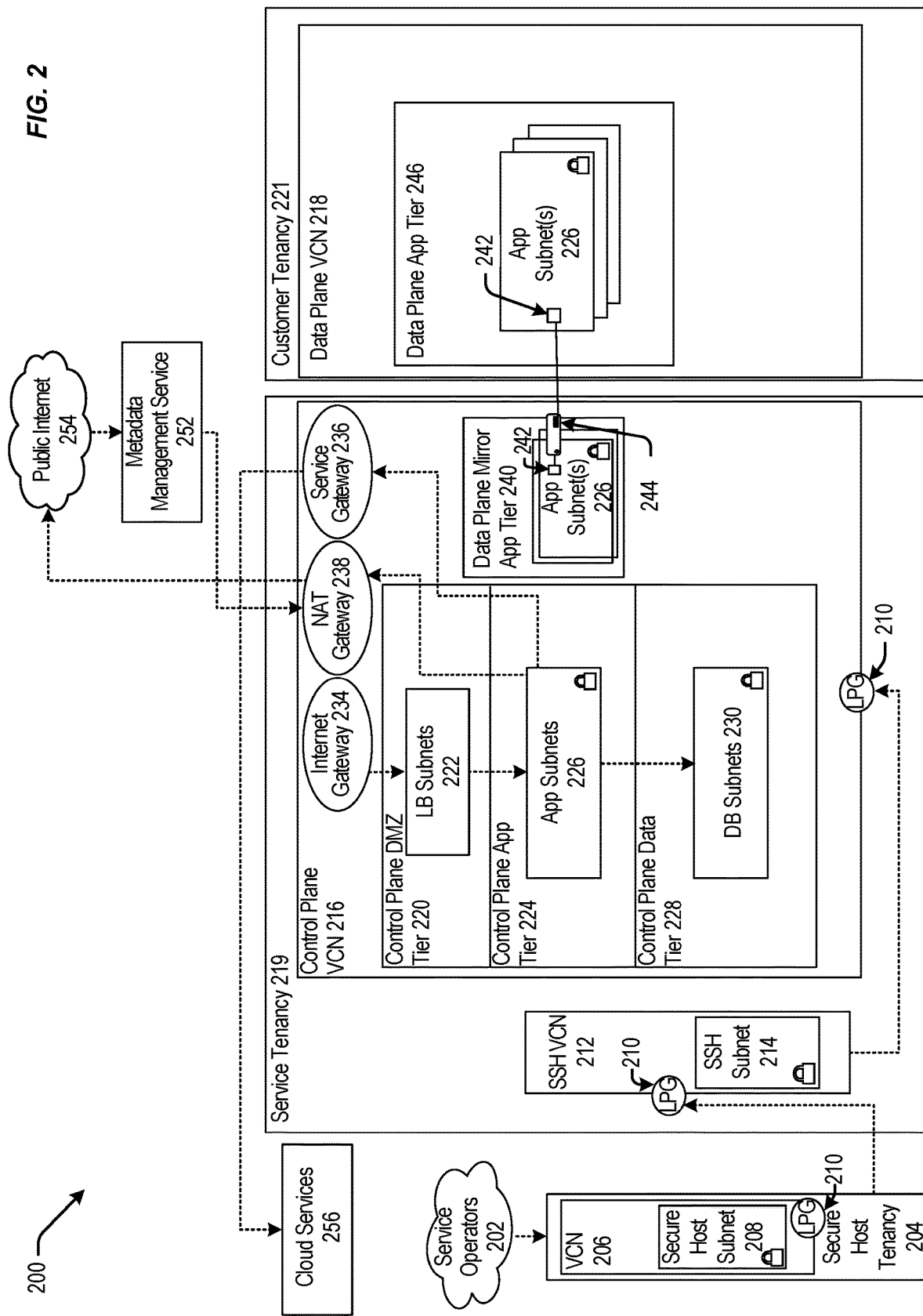

FIG. 2 is a block diagram illustrating another example pattern of an IaaS architecture 200, according to at least one embodiment. Service operators 202 (e.g., service operators 102 of FIG. 1) can be communicatively coupled to a secure host tenancy 204 (e.g., the secure host tenancy 104 of FIG. 1) that can include a virtual cloud network (VCN) 206 (e.g., the VCN 106 of FIG. 1) and a secure host subnet 208 (e.g., the secure host subnet 108 of FIG. 1). The VCN 206 can include a local peering gateway (LPG) 210 (e.g., the LPG 110 of FIG. 1) that can be communicatively coupled to a secure shell (SSH) VCN 212 (e.g., the SSH VCN 112 of FIG. 1) via an LPG 110 contained in the SSH VCN 212. The SSH VCN 212 can include an SSH subnet 214 (e.g., the SSH subnet 114 of FIG. 1), and the SSH VCN 212 can be communicatively coupled to a control plane VCN 216 (e.g., the control plane VCN 116 of FIG. 1) via an LPG 210 contained in the control plane VCN 216. The control plane VCN 216 can be contained in a service tenancy 219 (e.g., the service tenancy 119 of FIG. 1), and the data plane VCN 218 (e.g., the data plane VCN 118 of FIG. 1) can be contained in a customer tenancy 221 that may be owned or operated by users, or customers, of the system.

The control plane VCN 216 can include a control plane DMZ tier 220 (e.g., the control plane DMZ tier 120 of FIG. 1) that can include LB subnet(s) 222 (e.g., LB subnet(s) 122 of FIG. 1), a control plane app tier 224 (e.g., the control plane app tier 124 of FIG. 1) that can include app subnet(s) 226 (e.g., app subnet(s) 126 of FIG. 1), a control plane data tier 228 (e.g., the control plane data tier 128 of FIG. 1) that can include database (DB) subnet(s) 230 (e.g., similar to DB subnet(s) 130 of FIG. 1). The LB subnet(s) 222 contained in the control plane DMZ tier 220 can be communicatively coupled to the app subnet(s) 226 contained in the control plane app tier 224 and an Internet gateway 234 (e.g., the Internet gateway 134 of FIG. 1) that can be contained in the control plane VCN 216, and the app subnet(s) 226 can be communicatively coupled to the DB subnet(s) 230 contained in the control plane data tier 228 and a service gateway 236 (e.g., the service gateway 136 of FIG. 1) and a network address translation (NAT) gateway 238 (e.g., the NAT gateway 138 of FIG. 1). The control plane VCN 216 can include the service gateway 236 and the NAT gateway 238.

The control plane VCN 216 can include a data plane mirror app tier 240 (e.g., the data plane mirror app tier 140 of FIG. 1) that can include app subnet(s) 226. The app subnet(s) 226 contained in the data plane mirror app tier 240 can include a virtual network interface controller (VNIC) 242 (e.g., the VNIC of 142) that can execute a compute instance 244 (e.g., similar to the compute instance 144 of FIG. 1). The compute instance 244 can facilitate communication between the app subnet(s) 226 of the data plane mirror app tier 240 and the app subnet(s) 226 that can be contained in a data plane app tier 246 (e.g., the data plane app tier 146 of FIG. 1) via the VNIC 242 contained in the data plane mirror app tier 240 and the VNIC 242 contained in the data plane app tier 246.

The Internet gateway 234 contained in the control plane VCN 216 can be communicatively coupled to a metadata management service 252 (e.g., the metadata management service 152 of FIG. 1) that can be communicatively coupled to public Internet 254 (e.g., public Internet 154 of FIG. 1). Public Internet 254 can be communicatively coupled to the NAT gateway 238 contained in the control plane VCN 216. The service gateway 236 contained in the control plane VCN 216 can be communicatively couple to cloud services 256 (e.g., cloud services 156 of FIG. 1).

In some examples, the data plane VCN 218 can be contained in the customer tenancy 221. In this case, the IaaS provider may provide the control plane VCN 216 for each customer, and the IaaS provider may, for each customer, set up a unique, compute instance 244 that is contained in the service tenancy 219. Each compute instance 244 may allow communication between the control plane VCN 216, contained in the service tenancy 219, and the data plane VCN 218 that is contained in the customer tenancy 221. The compute instance 244 may allow resources, that are provisioned in the control plane VCN 216 that is contained in the service tenancy 219, to be deployed or otherwise used in the data plane VCN 218 that is contained in the customer tenancy 221.

In other examples, the customer of the IaaS provider may have databases that live in the customer tenancy 221. In this example, the control plane VCN 216 can include the data plane mirror app tier 240 that can include app subnet(s) 226. The data plane mirror app tier 240 can reside in the data plane VCN 218, but the data plane mirror app tier 240 may not live in the data plane VCN 218. That is, the data plane mirror app tier 240 may have access to the customer tenancy 221, but the data plane mirror app tier 240 may not exist in the data plane VCN 218 or be owned or operated by the customer of the IaaS provider. The data plane mirror app tier 240 may be configured to make calls to the data plane VCN 218 but may not be configured to make calls to any entity contained in the control plane VCN 216. The customer may desire to deploy or otherwise use resources in the data plane VCN 218 that are provisioned in the control plane VCN 216, and the data plane mirror app tier 240 can facilitate the desired deployment, or other usage of resources, of the customer.

In some embodiments, the customer of the IaaS provider can apply filters to the data plane VCN 218. In this embodiment, the customer can determine what the data plane VCN 218 can access, and the customer may restrict access to public Internet 254 from the data plane VCN 218. The IaaS provider may not be able to apply filters or otherwise control access of the data plane VCN 218 to any outside networks or databases. Applying filters and controls by the customer onto the data plane VCN 218, contained in the customer tenancy 221, can help isolate the data plane VCN 218 from other customers and from public Internet 254.

In some embodiments, cloud services 256 can be called by the service gateway 236 to access services that may not exist on public Internet 254, on the control plane VCN 216, or on the data plane VCN 218. The connection between cloud services 256 and the control plane VCN 216 or the data plane VCN 218 may not be live or continuous. Cloud services 256 may exist on a different network owned or operated by the IaaS provider. Cloud services 256 may be configured to receive calls from the service gateway 236 and may be configured to not receive calls from public Internet 254. Some cloud services 256 may be isolated from other cloud services 256, and the control plane VCN 216 may be isolated from cloud services 256 that may not be in the same region as the control plane VCN 216. For example, the control plane VCN 216 may be located in "Region 1," and cloud service "Deployment 1," may be located in Region 1 and in "Region 2." If a call to Deployment 1 is made by the service gateway 236 contained in the control plane VCN 216 located in Region 1, the call may be transmitted to Deployment 1 in Region 1. In this example, the control plane VCN 216, or Deployment 1 in Region 1, may not be communicatively coupled to, or otherwise in communication with, Deployment 1 in Region 2.

Figure 3:
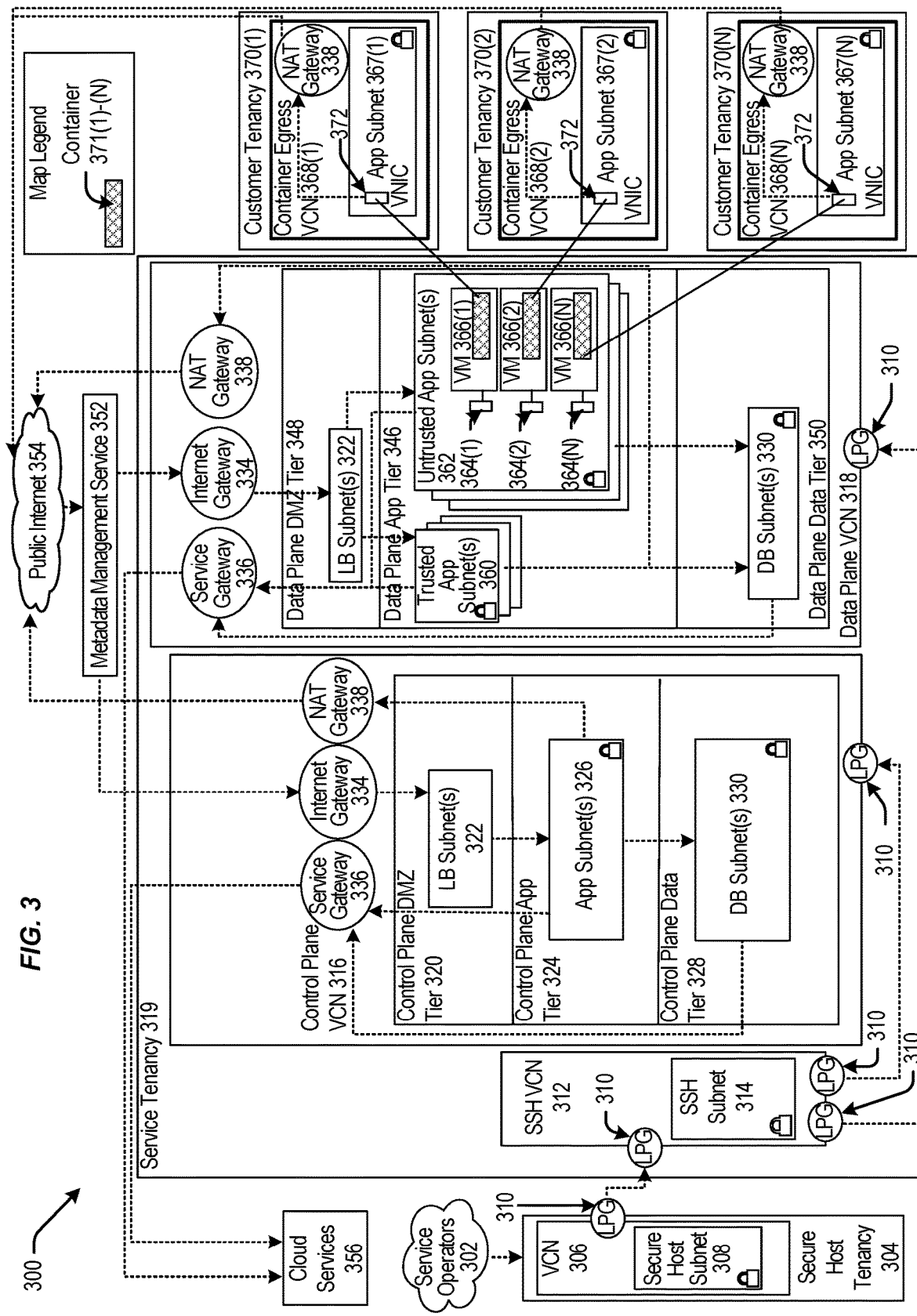

FIG. 3 is a block diagram illustrating another example pattern of an IaaS architecture 300, according to at least one embodiment. Service operators 302 (e.g., service operators 102 of FIG. 1) can be communicatively coupled to a secure host tenancy 304 (e.g., the secure host tenancy 104 of FIG. 1) that can include a virtual cloud network (VCN) 306 (e.g., the VCN 106 of FIG. 1) and a secure host subnet 308 (e.g., the secure host subnet 108 of FIG. 1). The VCN 306 can include an LPG 310 (e.g., the LPG 110 of FIG. 1) that can be communicatively coupled to an SSH VCN 312 (e.g., the SSH VCN 112 of FIG. 1) via an LPG 310 contained in the SSH VCN 312. The SSH VCN 312 can include an SSH subnet 314 (e.g., the SSH subnet 114 of FIG. 1), and the SSH VCN 312 can be communicatively coupled to a control plane VCN 316 (e.g., the control plane VCN 116 of FIG. 1) via an LPG 310 contained in the control plane VCN 316 and to a data plane VCN 318 (e.g., the data plane VCN 118 of FIG. 1) via an LPG 310 contained in the data plane VCN 318. The control plane VCN 316 and the data plane VCN 318 can be contained in a service tenancy 319 (e.g., the service tenancy 119 of FIG. 1).

The control plane VCN 316 can include a control plane DMZ tier 320 (e.g., the control plane DMZ tier 120 of FIG. 1) that can include load balancer (LB) subnet(s) 322 (e.g., LB subnet(s) 122 of FIG. 1), a control plane app tier 324 (e.g., the control plane app tier 124 of FIG. 1) that can include app subnet(s) 326 (e.g., similar to app subnet(s) 126 of FIG. 1), a control plane data tier 328 (e.g., the control plane data tier 128 of FIG. 1) that can include DB subnet(s) 330. The LB subnet(s) 322 contained in the control plane DMZ tier 320 can be communicatively coupled to the app subnet(s) 326 contained in the control plane app tier 324 and to an Internet gateway 334 (e.g., the Internet gateway 134 of FIG. 1) that can be contained in the control plane VCN 316, and the app subnet(s) 326 can be communicatively coupled to the DB subnet(s) 330 contained in the control plane data tier 328 and to a service gateway 336 (e.g., the service gateway of FIG. 1) and a network address translation (NAT) gateway 338 (e.g., the NAT gateway 138 of FIG. 1). The control plane VCN 316 can include the service gateway 336 and the NAT gateway 338.

The data plane VCN 318 can include a data plane app tier 346 (e.g., the data plane app tier 146 of FIG. 1), a data plane DMZ tier 348 (e.g., the data plane DMZ tier 148 of FIG. 1), and a data plane data tier 350 (e.g., the data plane data tier 150 of FIG. 1). The data plane DMZ tier 348 can include LB subnet(s) 322 that can be communicatively coupled to trusted app subnet(s) 360 and untrusted app subnet(s) 362 of the data plane app tier 346 and the Internet gateway 334 contained in the data plane VCN 318. The trusted app subnet(s) 360 can be communicatively coupled to the service gateway 336 contained in the data plane VCN 318, the NAT gateway 338 contained in the data plane VCN 318, and DB subnet(s) 330 contained in the data plane data tier 350. The untrusted app subnet(s) 362 can be communicatively coupled to the service gateway 336 contained in the data plane VCN 318 and DB subnet(s) 330 contained in the data plane data tier 350. The data plane data tier 350 can include DB subnet(s) 330 that can be communicatively coupled to the service gateway 336 contained in the data plane VCN 318.

The untrusted app subnet(s) 362 can include one or more primary VNICs 364(1)-(N) that can be communicatively coupled to tenant virtual machines (VMs) 366(1)-(N). Each tenant VM 366(1)-(N) can be communicatively coupled to a respective app subnet 367(1)-(N) that can be contained in respective container egress VCNs 368(1)-(N) that can be contained in respective customer tenancies 380(1)-(N). Respective secondary VNICs 372(1)-(N) can facilitate communication between the untrusted app subnet(s) 362 contained in the data plane VCN 318 and the app subnet contained in the container egress VCNs 368(1)-(N). Each container egress VCNs 368(1)-(N) can include a NAT gateway 338 that can be communicatively coupled to public Internet 354 (e.g., public Internet 154 of FIG. 1).

The Internet gateway 334 contained in the control plane VCN 316 and contained in the data plane VCN 318 can be communicatively coupled to a metadata management service 352 (e.g., the metadata management service 152 of FIG. 1) that can be communicatively coupled to public Internet 354. Public Internet 354 can be communicatively coupled to the NAT gateway 338 contained in the control plane VCN 316 and contained in the data plane VCN 318. The service gateway 336 contained in the control plane VCN 316 and contained in the data plane VCN 318 can be communicatively couple to cloud services 356.

In some embodiments, the data plane VCN 318 can be integrated with customer tenancies 380. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 346. Code to run the function may be executed in the VMs 366(1)-(N), and the code may not be configured to run anywhere else on the data plane VCN 318. Each VM 366(1)-(N) may be connected to one customer tenancy 380. Respective containers 381(1)-(N) contained in the VMs 366(1)-(N) may be configured to run the code. In this case, there can be a dual isolation (e.g., the containers 381(1)-(N) running code, where the containers 381(1)-(N) may be contained in at least the VM 366(1)-(N) that are contained in the untrusted app subnet(s) 362), which may help prevent incorrect or otherwise undesirable code from damaging the network of the IaaS provider or from damaging a network of a different customer. The containers 381(1)-(N) may be communicatively coupled to the customer tenancy 380 and may be configured to transmit or receive data from the customer tenancy 380. The containers 381(1)-(N) may not be configured to transmit or receive data from any other entity in the data plane VCN 318. Upon completion of running the code, the IaaS provider may kill or otherwise dispose of the containers 381(1)-(N).

In some embodiments, the trusted app subnet(s) 360 may run code that may be owned or operated by the IaaS provider. In this embodiment, the trusted app subnet(s) 360 may be communicatively coupled to the DB subnet(s) 330 and be configured to execute CRUD operations in the DB subnet(s) 330. The untrusted app subnet(s) 362 may be communicatively coupled to the DB subnet(s) 330, but in this embodiment, the untrusted app subnet(s) may be configured to execute read operations in the DB subnet(s) 330. The containers 381(1)-(N) that can be contained in the VM 366(1)-(N) of each customer and that may run code from the customer may not be communicatively coupled with the DB subnet(s) 330.

In other embodiments, the control plane VCN 316 and the data plane VCN 318 may not be directly communicatively coupled. In this embodiment, there may be no direct communication between the control plane VCN 316 and the data plane VCN 318. However, communication can occur indirectly through at least one method. An LPG 310 may be established by the IaaS provider that can facilitate communication between the control plane VCN 316 and the data plane VCN 318. In another example, the control plane VCN 316 or the data plane VCN 318 can make a call to cloud services 356 via the service gateway 336. For example, a call to cloud services 356 from the control plane VCN 316 can include a request for a service that can communicate with the data plane VCN 318.

Figure 4:
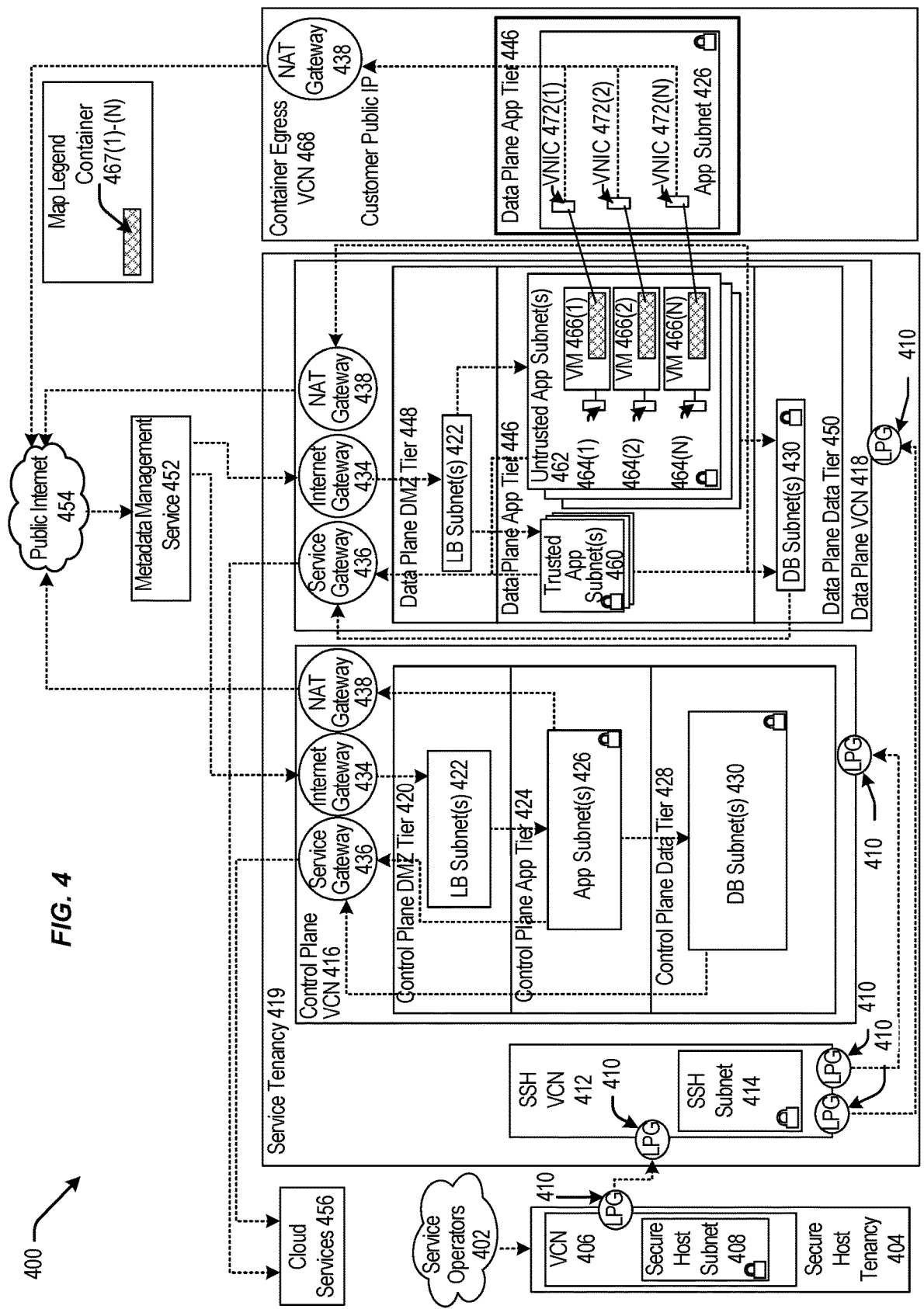

FIG. 4 is a block diagram illustrating another example pattern of an IaaS architecture 400, according to at least one embodiment. Service operators 402 (e.g., service operators 102 of FIG. 1) can be communicatively coupled to a secure host tenancy 404 (e.g., the secure host tenancy 104 of FIG. 1) that can include a virtual cloud network (VCN) 406 (e.g., the VCN 106 of FIG. 1) and a secure host subnet 408 (e.g., the secure host subnet 108 of FIG. 1). The VCN 406 can include an LPG 410 (e.g., the LPG 110 of FIG. 1) that can be communicatively coupled to an SSH VCN 412 (e.g., the SSH VCN 112 of FIG. 1) via an LPG 410 contained in the SSH VCN 412. The SSH VCN 412 can include an SSH subnet 414 (e.g., the SSH subnet 114 of FIG. 1), and the SSH VCN 412 can be communicatively coupled to a control plane VCN 416 (e.g., the control plane VCN 116 of FIG. 1) via an LPG 410 contained in the control plane VCN 416 and to a data plane VCN 418 (e.g., the data plane VCN 118 of FIG. 1) via an LPG 410 contained in the data plane VCN 418. The control plane VCN 416 and the data plane VCN 418 can be contained in a service tenancy 419 (e.g., the service tenancy 119 of FIG. 1).

The control plane VCN 416 can include a control plane DMZ tier 420 (e.g., the control plane DMZ tier 120 of FIG. 1) that can include LB subnet(s) 422 (e.g., LB subnet(s) 122 of FIG. 1), a control plane app tier 424 (e.g., the control plane app tier 124 of FIG. 1) that can include app subnet(s) 426 (e.g., app subnet(s) 126 of FIG. 1), a control plane data tier 428 (e.g., the control plane data tier 128 of FIG. 1) that can include DB subnet(s) 430 (e.g., DB subnet(s) 330 of FIG. 3). The LB subnet(s) 422 contained in the control plane DMZ tier 420 can be communicatively coupled to the app subnet(s) 426 contained in the control plane app tier 424 and to an Internet gateway 434 (e.g., the Internet gateway 134 of FIG. 1) that can be contained in the control plane VCN 416, and the app subnet(s) 426 can be communicatively coupled to the DB subnet(s) 430 contained in the control plane data tier 428 and to a service gateway 436 (e.g., the service gateway of FIG. 1) and a network address translation (NAT) gateway 438 (e.g., the NAT gateway 138 of FIG. 1). The control plane VCN 416 can include the service gateway 436 and the NAT gateway 438.

The data plane VCN 418 can include a data plane app tier 446 (e.g., the data plane app tier 146 of FIG. 1), a data plane DMZ tier 448 (e.g., the data plane DMZ tier 148 of FIG. 1), and a data plane data tier 450 (e.g., the data plane data tier 150 of FIG. 1). The data plane DMZ tier 448 can include LB subnet(s) 422 that can be communicatively coupled to trusted app subnet(s) 460 (e.g., trusted app subnet(s) 360 of FIG. 3) and untrusted app subnet(s) 462 (e.g., untrusted app subnet(s) 362 of FIG. 3) of the data plane app tier 446 and the Internet gateway 434 contained in the data plane VCN 418. The trusted app subnet(s) 460 can be communicatively coupled to the service gateway 436 contained in the data plane VCN 418, the NAT gateway 438 contained in the data plane VCN 418, and DB subnet(s) 430 contained in the data plane data tier 450. The untrusted app subnet(s) 462 can be communicatively coupled to the service gateway 436 contained in the data plane VCN 418 and DB subnet(s) 430 contained in the data plane data tier 450. The data plane data tier 450 can include DB subnet(s) 430 that can be communicatively coupled to the service gateway 436 contained in the data plane VCN 418.

The untrusted app subnet(s) 462 can include primary VNICs 464(1)-(N) that can be communicatively coupled to tenant virtual machines (VMs) 466(1)-(N) residing within the untrusted app subnet(s) 462. Each tenant VM 466(1)-(N) can run code in a respective container 467(1)-(N), and be communicatively coupled to an app subnet 426 that can be contained in a data plane app tier 446 that can be contained in a container egress VCN 468. Respective secondary VNICs 472(1)-(N) can facilitate communication between the untrusted app subnet(s) 462 contained in the data plane VCN 418 and the app subnet contained in the container egress VCN 468. The container egress VCN can include a NAT gateway 438 that can be communicatively coupled to public Internet 454 (e.g., public Internet 154 of FIG. 1).

The Internet gateway 434 contained in the control plane VCN 416 and contained in the data plane VCN 418 can be communicatively coupled to a metadata management service 452 (e.g., the metadata management service 152 of FIG. 1) that can be communicatively coupled to public Internet 454. Public Internet 454 can be communicatively coupled to the NAT gateway 438 contained in the control plane VCN 416 and contained in the data plane VCN 418. The service gateway 436 contained in the control plane VCN 416 and contained in the data plane VCN 418 can be communicatively couple to cloud services 456.

In some examples, the pattern illustrated by the architecture of block diagram 400 of FIG. 4 may be considered an exception to the pattern illustrated by the architecture of block diagram 300 of FIG. 3 and may be desirable for a customer of the IaaS provider if the IaaS provider cannot directly communicate with the customer (e.g., a disconnected region). The respective containers 467(1)-(N) that are contained in the VMs 466(1)-(N) for each customer can be accessed in real-time by the customer. The containers 467(1)-(N) may be configured to make calls to respective secondary VNICs 472(1)-(N) contained in app subnet(s) 426 of the data plane app tier 446 that can be contained in the container egress VCN 468. The secondary VNICs 472(1)-(N) can transmit the calls to the NAT gateway 438 that may transmit the calls to public Internet 454. In this example, the containers 467(1)-(N) that can be accessed in real-time by the customer can be isolated from the control plane VCN 416 and can be isolated from other entities contained in the data plane VCN 418. The containers 467(1)-(N) may also be isolated from resources from other customers.

In other examples, the customer can use the containers 467(1)-(N) to call cloud services 456. In this example, the customer may run code in the containers 467(1)-(N) that requests a service from cloud services 456. The containers 467(1)-(N) can transmit this request to the secondary VNICs 472(1)-(N) that can transmit the request to the NAT gateway that can transmit the request to public Internet 454. Public Internet 454 can transmit the request to LB subnet(s) 422 contained in the control plane VCN 416 via the Internet gateway 434. In response to determining the request is valid, the LB subnet(s) can transmit the request to app subnet(s) 426 that can transmit the request to cloud services 456 via the service gateway 436.

It should be appreciated that IaaS architectures 100, 200, 300, 400 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QOS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

4. Computer System

Figure 5:
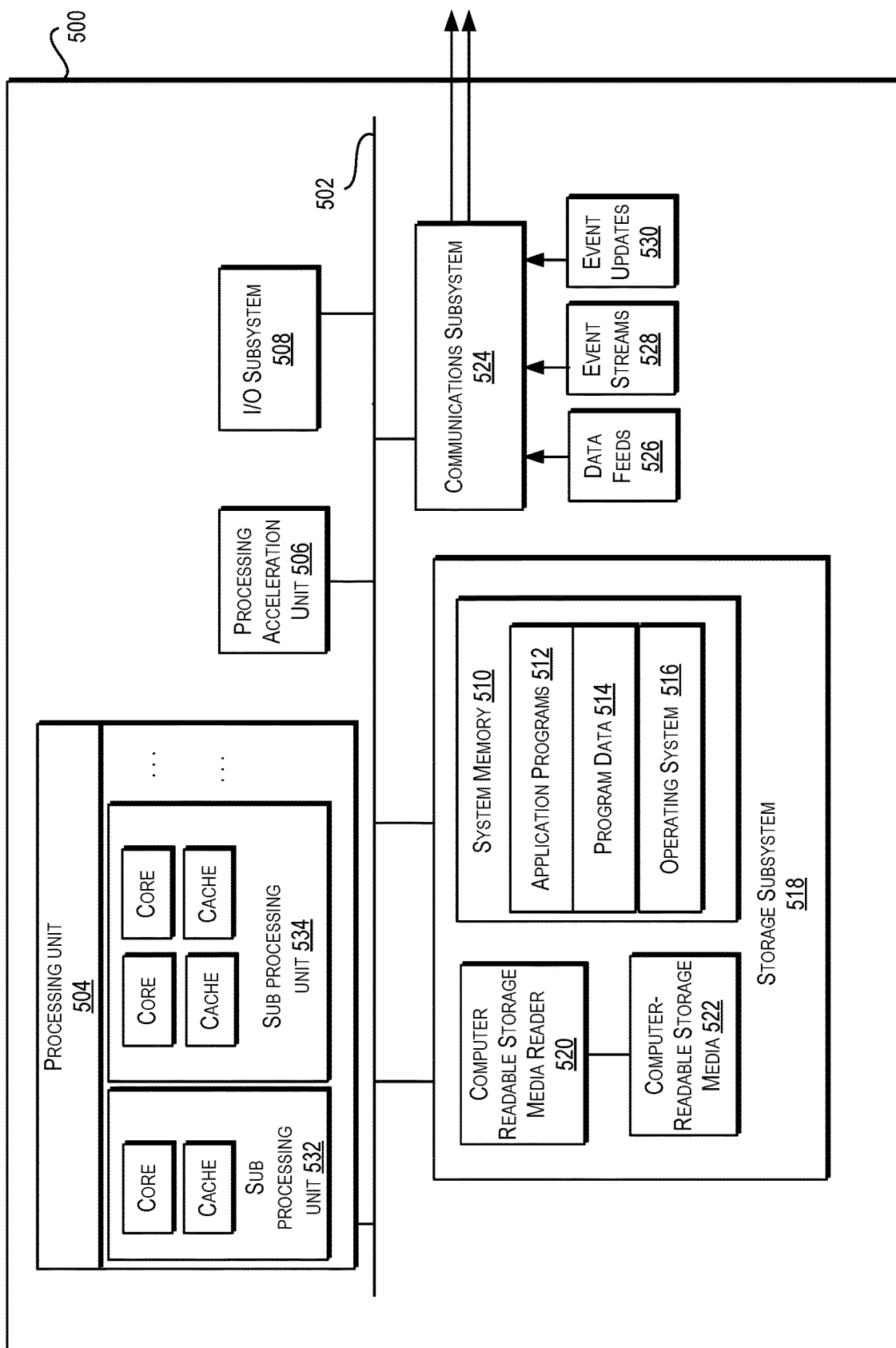
FIG. 5 is a hardware system in accordance with one or more embodiments.

FIG. 5 illustrates an example computer system 500, in which various embodiments may be implemented. The system 500 may be used to implement any of the computer systems described above. As shown in FIG. 5, computer system 500 includes a processing unit 504 that communicates with a number of peripheral subsystems via a bus subsystem 502. These peripheral subsystems may include a processing acceleration unit 506, an I/O subsystem 508, a storage subsystem 518 and a communications subsystem 524. Storage subsystem 518 includes tangible computer-readable storage media 522 and a system memory 510.

Bus subsystem 502 provides a mechanism for letting the various components and subsystems of computer system 500 communicate with each other as intended. Although bus subsystem 502 is shown schematically as a single bus, alternative embodiments of the bus subsystem may utilize multiple buses. Bus subsystem 502 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 504, which can be implemented as one or more integrated circuits (e.g., a conventional microprocessor or microcontroller), controls the operation of computer system 500. One or more processors may be included in processing unit 504. These processors may include single core or multicore processors. In certain embodiments, processing unit 504 may be implemented as one or more independent processing units 532 and/or 534 with single or multicore processors included in each processing unit. In other embodiments, processing unit 504 may also be implemented as a quad-core processing unit formed by integrating two dual-core processors into a single chip.

In various embodiments, processing unit 504 can execute a variety of programs in response to program code and can maintain multiple concurrently executing programs or processes. At any given time, some or all of the program code to be executed can be resident in processing unit 504 and/or in storage subsystem 518. Through suitable programming, processing unit 504 can provide various functionalities described above. Computer system 500 may additionally include a processing acceleration unit 506, which can include a digital signal processor (DSP), a special-purpose processor, and/or the like.

I/O subsystem 508 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 500 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 500 may comprise a storage subsystem 518 that provides a tangible non-transitory computer-readable storage medium for storing software and data constructs that provide the functionality of the embodiments described in this disclosure. The software can include programs, code modules, instructions, scripts, etc., that when executed by one or more cores or processors of processing unit 504 provide the functionality described above. Storage subsystem 518 may also provide a repository for storing data used in accordance with the present disclosure.

As depicted in the example in FIG. 5, storage subsystem 518 can include various components including a system memory 510, computer-readable storage media 522, and a computer readable storage media reader 520. System memory 510 may store program instructions, such as application programs 512, that are loadable and executable by processing unit 504. System memory 510 may also store data, such as program data 514, that is used during the execution of the instructions and/or data that is generated during the execution of the program instructions. Various different kinds of programs may be loaded into system memory 510 including but not limited to client applications, Web browsers, mid-tier applications, relational database management systems (RDBMS), virtual machines, containers, etc.

System memory 510 may also store an operating system 516. Examples of operating system 516 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where computer system 500 executes one or more virtual machines, the virtual machines along with their guest operating systems (GOSs) may be loaded into system memory 510 and executed by one or more processors or cores of processing unit 504.

System memory 510 can come in different configurations depending upon the type of computer system 500. For example, system memory 510 may be volatile memory (such as random access memory (RAM)) and/or non-volatile memory (such as read-only memory (ROM), flash memory, etc.) Different types of RAM configurations may be provided including a static random access memory (SRAM), a dynamic random access memory (DRAM), and others. In some implementations, system memory 510 may include a basic input/output system (BIOS) containing basic routines that help to transfer information between elements within computer system 500, such as during start-up.

Computer-readable storage media 522 may represent remote, local, fixed, and/or removable storage devices plus storage media for temporarily and/or more permanently containing, storing, computer-readable information for use by computer system 500 including instructions executable by processing unit 504 of computer system 500.

Computer-readable storage media 522 can include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 522 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 522 may include, but is not limited to, Zip® drives, flash memory cards, universal serial bus (USB) flash drives, secure digital (SD) cards, DVD disks, digital video tape, and the like. Computer-readable storage media 522 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 500.

Machine-readable instructions executable by one or more processors or cores of processing unit 504 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 524 provides an interface to other computer systems and networks. Communications subsystem 524 serves as an interface for receiving data from and transmitting data to other systems from computer system 500. For example, communications subsystem 524 may enable computer system 500 to connect to one or more devices via the Internet. In some embodiments communications subsystem 524 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 524 can provide wired network connectivity (e.g., Ethernet) in addition to or instead of a wireless interface.

In some embodiments, communications subsystem 524 may also receive input communication in the form of structured and/or unstructured data feeds 526, event streams 528, event updates 530, and the like on behalf of one or more users who may use computer system 500.

By way of example, communications subsystem 524 may be configured to receive data feeds 526 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 524 may also be configured to receive data in the form of continuous data streams, which may include event streams 528 of real-time events and/or event updates 530, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 524 may also be configured to output the structured and/or unstructured data feeds 526, event streams 528, event updates 530, and the like to one or more databases that may be in communication with one or more streaming data source computers coupled to computer system 500.

Computer system 500 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 500 depicted in FIG. 5 is intended only as a specific example. Many other configurations having more or fewer components than the system depicted in FIG. 5 are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

5. Architectural Overview

Figure 6:
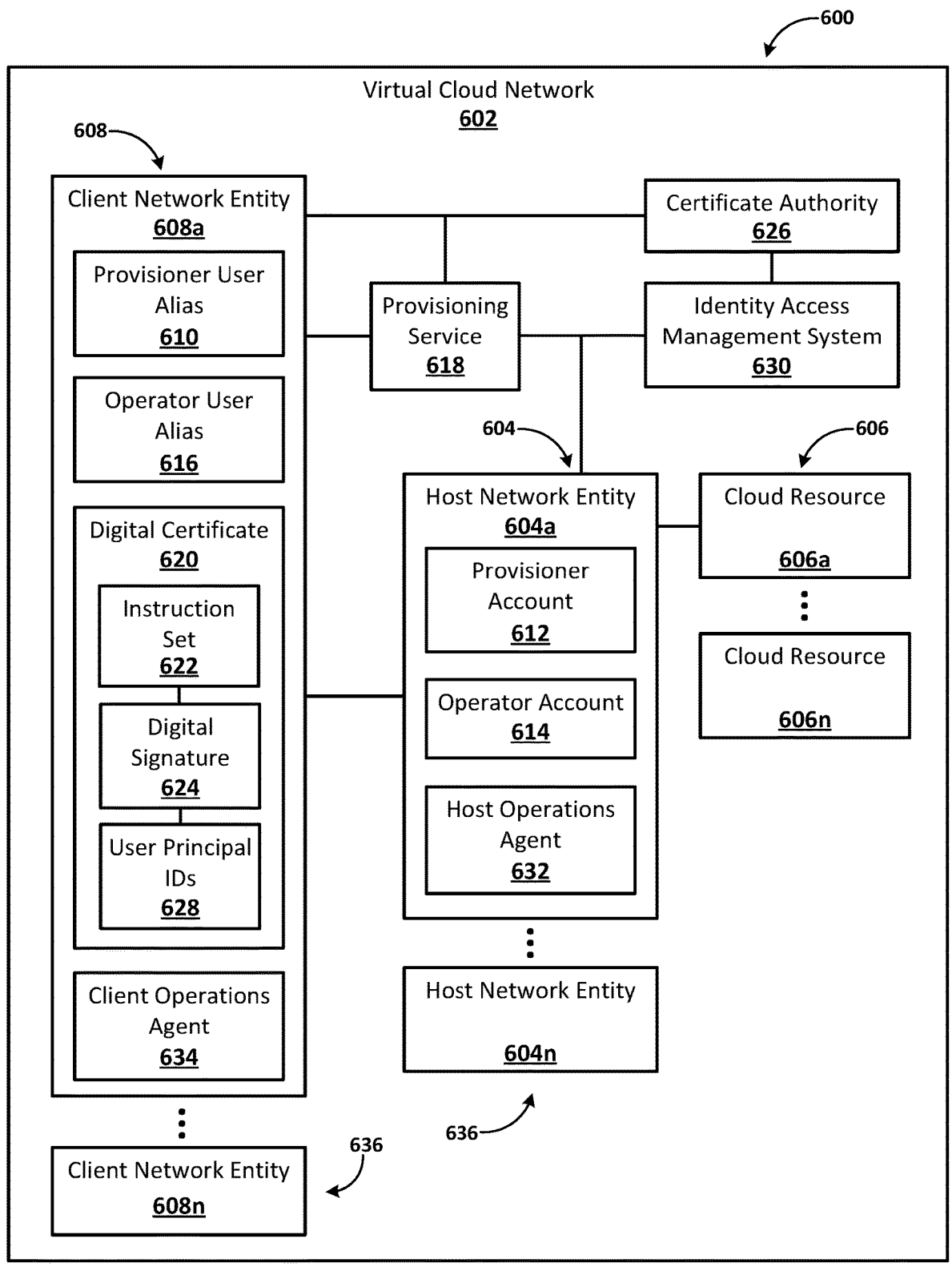
FIG. 6 illustrates features of an example system in accordance with one or more embodiments.

FIG. 6 illustrate one example of a system 600 in accordance with one or more embodiments. The system 600 described with reference to FIG. 6 may perform operations associated with generating operator user account for use by client network entities to access could resources available via host network entities. Additionally, the system 600 may perform operations associated with establishing operator account connections between host network entities and client network entities.

As shown in FIG. 6, the system may include a computing network, such as virtual cloud network 602. The virtual cloud network 602 may include one or more host network entities 604, such as host network entity 604a and host network entity 604n. The virtual cloud network 602 may further include one or more target resources 606, such as cloud resource 606a and cloud resource 606n. The one or more target resources 606 may be accessible via a host network entity 604. For example, cloud resource 606a and cloud resource 606n may be accessible via host network entity 604a. As examples, a target resource 606 may include one or more of: web services, file sharing, database access, messaging services, identity access management services, compute resources, storage services, load balancing, content management systems, content delivery network services, streaming services, analytics services, security services, machine learning services, microservices, blockchain services, VPN services, container orchestration services, payment processing services, or e-commerce services.

One or more client network entities 608, such as client network entity 608a and client network entity 608n, may access the one or more target resources 606 via the one or more host network entities 604. The one or more client network entities 608 may be located on the virtual cloud network 602. Additionally, or in the alternative, the one or more client network entities 608 may be located external to the virtual cloud network 602. In one example, virtual cloud network 602 may represent a portion of a multi-could network. For example, virtual cloud network 602 may be associated with a first cloud provider, and a second virtual cloud network (not shown) may be associated with a second cloud provider. The one or more host network entities 604 and the one or more target resources 606 may be located on virtual cloud network 602, and one or more client network entities 608 may be located on the second virtual cloud network. Additionally, or in the alternative, the one or more client network entities 608 may be located on an on-premises network.

To access a target resource 606 associated with a network entity 604, a client network entity 608 may first utilize a provisioner user alias 610 to connect to the host network entity 604 via a provisioner account 612 to request that the host network entity 604 generate an operator account 614. After the host network entity 604 has generated the operator account 614, the client network entity 608 may access the target resource 606 by utilizing an operator user alias 616 to connect to the host network entity 604 via the operator account 614. The target resource 606 may be accessible to the client network entity 608 via the operator account 614. The target resource 606 may be inaccessible to the client network entity 608 via the provisioner account 612.

The provisioner user alias 610 may be utilized to connect the client network entity 608 to the host network entity 604 via the provisioner account 612 for the limited purpose of requesting the host network entity 604 to generate an operator account 614. The provisioner account 612 may have limited permissions, limited access levels, and/or limited roles. The limited permissions, access levels, and/or roles of the provisioner account 612 may allow the network entity 604 to execute operations associated with generating the operator account 614. In one example, the operations executable by the network entity 604 via the provisioner account 612 may be limited to operations associated with generating the operator account 614.

The operator user alias 616 may be utilized to connect to the host network entity 604 via the operator account 614 for the purpose of accessing and using one or more target resources 606. The one or more target resources 606 may be hosted by, or available through, the host network entity 604. The operator account 614 may have permissions, access levels, and/or roles that allow the client network entity 608 to access and use the one or more target resources 606, for example, when the operator user alias 616 is utilized to connect the client network entity 608 to the host network entity 604 via the operator account 614. The permissions, access levels, and/or roles associated with the provisioner account 612 do not allow the client network entity 608 to access or use the one or more target resources 606.

The client network entity 608 may be configured with the provisioner user alias 610, and/or the host network entity 604 may be configured with the provisioner account 612, prior to the client network entity 608 connecting to the host network entity 604. In one example, the virtual cloud network 602 may include a provisioning service 618. The provisioning service 618 may perform one or more operations associated with provisioning the client network entity 608 with the provisioner user alias 610. Additionally, or in the alternative, the provisioning service 618 may perform one or more operations associated with provisioning the host network entity 604 with the provisioner account 612.

In one example, the client network entity 608 may be configured with the provisioner user alias 610 as part of an instantiation process for instantiating the client network entity 608 on the virtual cloud network 602. Additionally, or in the alternative, the host network entity 604 may be configured with the provisioner account 612 as part of an instantiation process for instantiating the host network entity 604 on the virtual cloud network 602. In one example, at least a portion of the instantiation process for the client network entity 608 and/or the host network entity 604 may be performed by the provisioning service 618. The instantiation process may include creating or initializing the client network entity 608 and/or the host network entity 604 (as applicable), for example, so that the client network entity 608 and/or the host network entity 604 (as applicable) becomes operational and ready to run applications or services. Additionally, or in the alternative, the instantiation process may include allocating computing resources (CPU, memory, storage) and configuring the client network entity 608 and/or the host network entity 604 (as applicable) with an operating system and other software components. Alternatively, the client network entity 608 may be configured with the provisioner user alias 610, and/or the host network entity 604 may be configured with the provisioner account 612, subsequent to and/or separate from the respective instantiation process.

When connecting to the host network entity 604 via the provisioner account 612, the client network entity 608 may present a digital certificate 620 to the host network entity 604. The digital certificate 620 may be utilized to authenticate the client network entity 608. Additionally, the digital certificate 620 may include an instruction set 622. The instruction set 622 may be included in metadata contained in the digital certificate 620. The instruction set 622 may include configuration instructions executable by the host network entity 604 to generate the operator account 614. The digital certificate 620 may further include a digital signature 624 associated with the instruction set 622 and/or the metadata. The instruction set 622 and/or the metadata may be digitally signed by a certificate authority 626 that is trusted by the host network entity 604. For example, the certificate authority 626 that digitally signs the instruction set 622 and/or the metadata may be the certificate authority 626 that issued the digital certificate 620.

When the host network entity 604 receives the digital certificate 620 from the client network entity 608, the host network entity 604 may validate the digital certificate 620 and the instruction set 622 and/or the metadata included in the digital certificate 620. Responsive to successfully validating the digital certificate 620 and the instruction set 622 and/or the metadata included in the digital certificate 620, the host network entity 604 may generate the operator account 614 based on the instruction set 622. In one example, successful validation of the digital certificate 620 and/or the instruction set 622 (or metadata containing the instruction set 622) may trigger the host network entity 604 to generate the operator account 614.

In one example, the digital certificate 620 may include one or more user principal identifiers 628. The one or more user principal identifiers may identify the provisioner user alias 610 as an authorized user principal. The host network entity 604 may determine one or more access policies associated with the provisioner user alias 610, for example, in an identity access management (IAM) system 630. The one or more access policies in the IAM system 630 may define the permissions, access levels, and/or roles associated with the provisioner user alias 610. The one or more access policies associated with the provisioner user alias 610 may allow the provisioner user alias 610 to be utilized to connect to the host network entity 604 via the provisioner account 612 for the purpose of generating the operator account 614. In one example, after determining the one or more access policies associated with the provisioner user alias 610, the host network entity 604 may automatically establish a connection with the client network entity 608 via the provisioner account 612. In one example, the instruction set 622 may include connection instructions executable by the host network entity 604 to automatically establish the connection with the client network entity 608 via the provisioner account 612, for example, responsive to determining the one or more access policies associated with the provisioner user alias 610. Upon having established the connection with the client network entity 608 via the provisioner account 612, the host network entity 604 may proceed to generate the operator account 614, for example, in accordance with the instruction set 622.

After the operator account 614 is generated and the connection between the client network entity 608 and the host network entity 604 via the provisioner account 612 is terminated, a connection between the client network entity 608 and the host network entity 604 may be established via the operator account 614. The client network entity 608 may present a credential to authenticate with the host network entity 604. The credential may be the same digital certificate 620 presented to the host network entity 604 when the client network entity 608 utilized the provisioner user alias 610 to connect to the host network entity 604 via the provisioner account 612. The host network entity 604 may validate the credential, such as the digital certificate 620, and responsive to successfully validating the credential, the host network entity 604 may establish a connection with the client network entity via the operator account 614.

In one example, the one or more user principal identifiers 628 in the digital certificate 620 may identify the operator user alias 616 as an authorized user principal. In one example, the digital certificate 620 may identify the operator user alias 616 as a first authorized user principal and the operator user alias 616 as a second authorized user principal, and the digital certificate 620 may be utilized both for a first connection via the provisioner account 612 and a second connection via the operator account 614. Alternatively, when a second credential is utilized for connecting via the operator account 614, the second credential may identify the operator user alias 616 as an authorized user principal.

The host network entity 604 may determine one or more access policies associated with the operator user alias 616, for example, in the IAM system 630. The one or more access policies in the IAM system 630 may define the permissions, access levels, and/or roles associated with the operator user alias 616. The one or more access policies associated with the operator user alias 616 may allow the operator user alias 616 to be utilized to connect to the host network entity 604 via the operator account 614 for the purpose of accessing the one or more target resources 606. In one example, after determining the one or more access policies associated with the operator user alias 616, the host network entity 604 may automatically establish a connection with the client network entity 608 via the operator account 614. In one example, the instruction set 622 may include connection instructions executable by the host network entity 604 to automatically establish the connection with the client network entity 608 via the operator account 614, for example, responsive to determining the one or more access policies associated with the operator user alias 616. Upon having established the connection with the client network entity 608 via the operator account 614, the client network entity 608 may proceed to access the one or more target resources 606.

In one example, the host network entity 604 may include a host operations agent 632. Additionally, or in the alternative, the client network entity 608 may include a client operations agent 634. In one example, the host operations agent 632 and the client operations agent 634 may work in concert with one another to establish a first connection between the client network entity 608 and the host network entity 604 for generating the operator account 614 and/or to establish a second connection between the client network entity 608 and the host network entity 604 for the client network entity 608 to access the one or more target resources 606. The host operations agent 632 may execute operations associated with the host network entity 604. The operations executed by the host operations agent 632 may include operations associated with establishing and/or terminating connections with the client network entity 608. Additionally, or in the alternative, the operations executed by the host operations agent 632 may include operations associated with generating the operator account 614. The client operations agent 634 may execute operations associated with the client network entity 608. The operations executed by the client operations agent 634 may include operations associated with establishing and/or terminating connections with the host network entity 604. In one example, the host operations agent 632 and/or the client operations agent 634 may be configured to execute instructions that cause a first connection to be established between the client network entity 608 and the host network entity 604 for generating the operator account 614, and to terminate the first connection upon host network entity 604 having generated the operator account 614. Additionally, or in the alternative, the host operations agent 632 and/or the client operations agent 634 may be configured to execute instructions that cause a second connection to be established between the client network entity 608 and the host network entity 604 for the client network entity 608 to access the one or more target resources 606. In one example, the instructions executed by the host operations agent 632 and/or the client operations agent 634 may automatically establish the second connection responsive to the first connection being terminated. In one example, the host operations agent 632 and/or the client operations agent 634 may perform operations associated with validating credentials, such as the digital certificate. Additionally, or in the alternative, the host operations agent 632 may perform operations associated with determining access policies in the IAM system 630.

Referring further to FIG. 6, The system 600 may include a plurality of network entities 636. The plurality of network entities 636 may include a plurality of host network entities 604, a plurality of client network entities 608, and/or a plurality of target resources 606. The network entities 636 may be located throughout one or more virtual cloud networks 602. A network entity 636 may reside on a substrate network, an overlay network, or a network interface. A network entity 636 may be implemented in hardware and/or software. A network entity may include a node, a host, an agent, a service, a component, an endpoint, or other element. The plurality of network entities 636 may include one or more substrate entities, one or more interface entities, and/or one or more overlay entities.

As used herein, the term "substrate entity" refers to a network entity 636 implemented in a substrate network. As used herein, the term "substrate network" refers to a physical network infrastructure. The substrate network generally provides a foundation of a virtual cloud network. The substrate network may include physical network devices, such as routers, switches, network links, and other networking components. The substrate network may generally provide the basic connectivity and transport capabilities necessary for data transmission within and between data centers.

The one or more substrate entities may include substrate hosts, routers, firewall appliances, load balancers, storage devices, and/or substrate services. A substrate host may include an endpoint within the substrate network, such as a bare metal host, a virtual machine, a container, or a physical server. A substrate service may include a service executing or executable on a substrate entity, such as a firmware service, a network connectivity service, an addressing service, a name resolution service, a security service, a network monitoring service, a load balancing service, and/or a storage service. A firmware service may be associated with functionality or management of network infrastructure components or services, such as network devices, boot-up or initialization process, hardware controls, feature enablement, updates, hardware abstraction, network configuration, and/or network management. In one example, a substrate entity may include a combination of hardware and software. In one example, the one or more substrate entities may include one or more substrate hosts, and/or one or more substrate services. In one example, a substrate host may include a bare metal host. In one example, a substrate service may include a firmware service. The substrate entities may communicate with one another, and/or with other network entities 636, using logical network addresses assigned within the overlay network.

As used herein, the term "network interface" refers to a communication interface between a substrate network and an overlay network, such as a network interface card, a smartNIC, or the like. A network interface may include one or more interface entities, such as a node on the network interface, or an interface service executing or executable on the network interface. A node on the network interface may include a programmable hardware component, a memory component, or a gateway component. In one example, a network interface may include a network interface card, such as a smartNIC. Additionally, or in the alternative, a network interface may include a node or an endpoint on a network interface card or smartNIC.

A gateway component may provide connectivity between the substrate network and the network interface, and/or between the network interface and the overlay network. For example, a gateway component may enable communication between overlay entities and substrate entities. Additionally, or in the alternative, a gateway component may provide connectivity between the overlay network and external networks, such as the internet or other networks outside the overlay network. For example, an overlay gateway may enable communication between overlay entities and external endpoints.

As used herein, the term "overlay network" refers to a virtual network built on a substrate network using software-defined networking (SDN), virtualization, tunneling, and/or encapsulation technologies. An overlay network generally operates independently of the underlying substrate network. An overlay network may provide logical separation and isolation of traffic, enable virtual network provisioning, and/or allow for implementation of various network services and policies. Virtual machines, hosts, containers, or virtual network functions running on a substrate network may be connected via an overlay network.

As used herein, the term "overlay entity" refers to a network entity implemented on an overlay network. The overlay network may include a plurality of overlay entities. The plurality of overlay entities may include overlay hosts, overlay services, subnets, overlay controllers, and/or overlay clients. In one example, the overlay network may include a plurality of overlay entities. In one example, an overlay entity may include an overlay host. Additionally, or in the alternative, an overlay entity may include an overlay service. The plurality of overlay entities may communicate with one another using logical network addresses assigned within the overlay network.

An overlay host may include an endpoint within the overlay network, such as a virtual machine, a container, or a physical server. An overlay service may include a service executing or executable on an overlay entity. An overlay service may include a client-specific service, such as a service installed by a client. Additionally, or in the alternative, an overlay service may include a virtual network creation service, a virtual network management service, a virtual machine orchestration service, a container orchestration service, a network virtualization service, an overlay security service, a load balancing service, a multi-tenancy service, and/or a tenant isolation service.

A subnet may include a virtual network segment that has a distinct addressing scheme and/or a distinct set of network policies and/or services. A subnet may include a set of overlay hosts. Multiple subnets may be utilized to partition respective sets of overlay hosts. An overlay controller may oversee management, control, provisioning, configuration, and/or monitoring of an overlay network, network entities on the overlay network, and/or network policies within the overlay. An overlay controller interact with the underlying substrate network, for example, to coordinate the operation of overlay hosts and/or communications across virtual switches and tunnels. An overlay client may include an endpoint or device that initiates communication within the overlay network. An overlay client may be a specific instance or role within an overlay host. An overlay host may include a set of overlay clients. An overlay client may include a consumer or user of services provided by overlay hosts or the IaaS. An overlay client may request and consume resources or services from overlay hosts, acting as consumers or clients of those resources or services.

The plurality of network entities 636 may include a plurality of data repositories. Each of the data repositories may include any type of storage unit and/or device (e.g., a file system, database, collection of tables, or any other storage mechanism) for storing data. Further, a data repository may include multiple different storage units and/or devices. The multiple different storage units and/or devices may or may not be of the same type or located at the same physical site. The data repositories may share one or more storage units with one another. Additionally, or in the alternative, the data repositories may include one or more storage units that differ from one another. Further, one or more of the data repositories may be implemented or executed on the same computing system as virtual cloud network 602. Additionally, or in the alternative, one or more of the data repositories may be implemented or executed on a computing system separate from virtual cloud network 602.

In one or more embodiments, the system 600 may include more or fewer components than the components illustrated in FIG. 6. The components illustrated in FIG. 6 may be local to or remote from each other. The components illustrated in FIG. 6 may include software and/or hardware components. Each component may be distributed over multiple applications and/or machines. Multiple components may be combined into one application and/or machine. Operations described with respect to one component may instead be performed by another component. Additional embodiments and/or examples relating to the system 600 are described above in Section 2, titled "Cloud Computing Technology".

In an embodiment, the system 600 may include various components implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant (PDA), a wireless receiver and/or transmitter, a base station, a communication management device, a router, a switch, a controller, an access point, and/or a client device.

6. Generating Operator Accounts

Figure 7A:
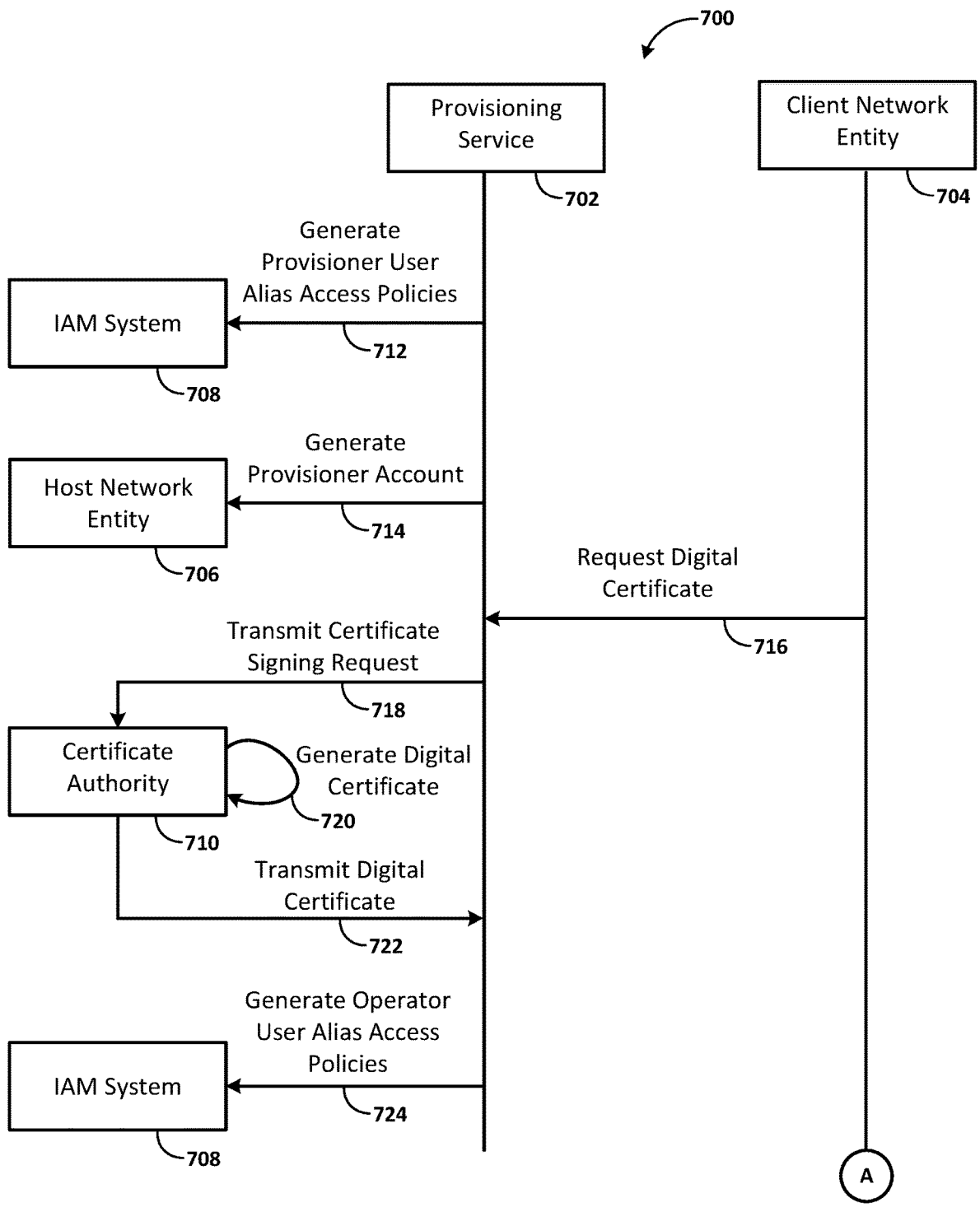
FIGS. 7A and 7B show a diagram that illustrates example operations pertaining to generating operator accounts for use by client network entities to access could resources available via host network entities.
Figure 7B:
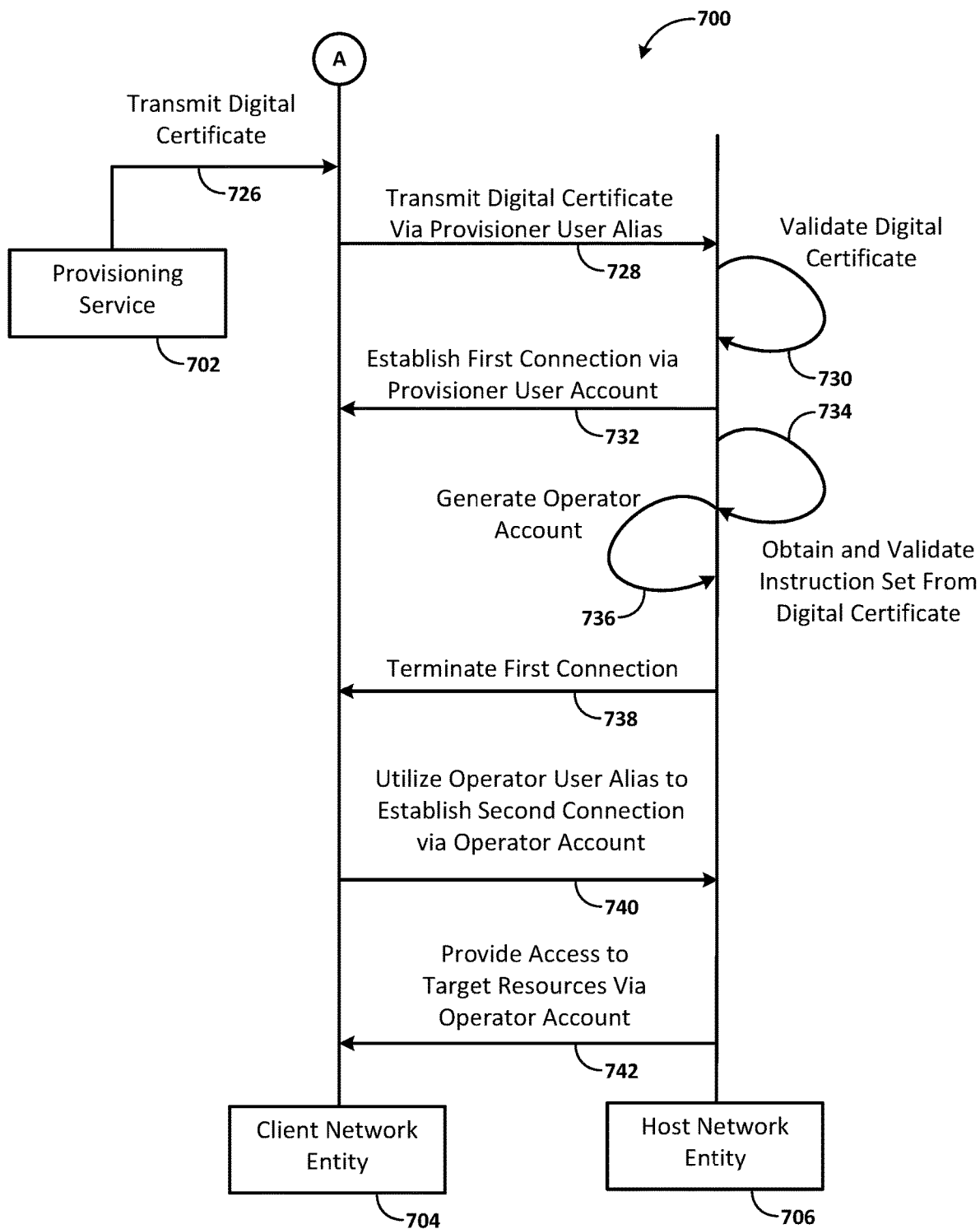

Referring now to FIGS. 7A and 7B, operations 700 pertaining to generating operator accounts are further described. One or more operations 700 described with reference to in FIGS. 7A and 7B may be modified, combined, rearranged, or omitted all together. Accordingly, the particular sequence of operations 700 described with reference to FIGS. 7A and 7B should not be construed as limiting the scope of one or more embodiments. As shown in FIGS. 7A and 7B, the operations 700 may include operations performed by and/or associated with a provisioning service 702, a client network entity 704, and/or a host network entity 706. The operations associated with the client network entity 704 may be performed by a client operations agent 634 (FIG. 6). The operations associated with the host network entity 706 may be performed by a host operations agent 632 (FIG. 6). Additionally, or in the alternative, the operations 700 may include operations performed by and/or associated with an IAM system 708, and/or a certificate authority 710. Referring to FIG. 7A, the provisioning service 702 may transmit one or more instructions to the IAM system 708 to cause the IAM system 708 to generate one or more access policies associated with a provisioner user alias (operation 712). Additionally, the provisioning service 702 may transmit one or more instructions to the host network entity 706 to cause the host network entity 706 to generate a provisioner account (operation 714).

The client network entity 704 may transmit a request for a digital certificate to the provisioning service 702 (operation 716). In response to the request from the client network entity 704, the provisioning service 702 may transmit a certificate signing request to the certificate authority 710 (operation 718). In response to the certificate signing request, the certificate authority 710 may generate a digital certificate (operation 720). Additionally, the certificate authority may validate that the client network entity 704 is authorized to access the host network entity 706 and/or the target resources available via the host network entity 706, for example, prior to generating the digital certificate. Additionally, or in the alternative, the provisioning service 702 may validate that the client is authorized and may provide validation information to the certificate authority 710.

In one example, to generate the digital certificate, the certificate authority may perform a set of certificate provisioning operations. The certificate provisioning operations may include generating an instruction set that contains instructions executable by the host network entity 706 to generate an operator account. In one example, the instruction set may be contained in metadata, and the certificate provisioning operations may include generating metadata and incorporating the instruction set into the metadata. Additionally, or in the alternative, the certificate provisioning operations may include generating a digital signature associated with the instruction set using a private key associated with the certificate authority. The private key may correspond to a public key accessible by the host network entity 706 to validate the digital signature. The certificate provisioning operations may further include generating the digital certificate. Additionally, certificate provisioning operations may include incorporating the instruction set and the digital signature into the digital certificate. Where the instruction set is contained in metadata, the certificate provisioning operations may include incorporating the metadata into the digital certificate. Additionally, or in the alternative, the certificate provisioning operations may include identifying the provisioner user alias and the operator user alias as authorized user principals. The provisioner user alias and the operator user alias may be identified as authorized user principals in the metadata incorporated into the digital certificate. Additionally, in addition to digitally signing the metadata and/or the instruction set, the certificate authority 710 may digitally sign the digital certificate.

Upon having generated the digital certificate, the certificate authority 710 may transmit the digital certificate to the provisioning service 702 (operation 722). Additionally, the provisioning service may transmit one or more instructions to the IAM system 708 to cause the IAM system 708 to generate one or more access policies for an operator user alias (operation 724).

Referring to FIG. 7B, upon having received the digital certificate from the certificate authority 710 (FIG. 7A, operation 722), the provisioning service 702 may transmit the digital certificate to the client network entity 704 (operation 726). To establish a connection with the host network entity 706, the client network entity 704 may transmit the digital certificate to the host network entity 706 via the provisioner user alias (operation 728). The one or more access policies associated with the provisioner user alias may be limited to operations associated with generating an operator account. For example, the one or more access polices associated with the provisioner user alias may be limited to providing the digital certificate to the host network entity.

The host network entity 706 may validate the digital certificate (operation 730), and responsive to validating the digital certificate, the host network entity 706 may establish a first connection with the client network entity 704 via the provisioner account. Additionally, responsive to validating the digital certificate, the host network entity 706 may obtain an instruction set from the digital certificate and validate the instruction set (operation 734). The instruction set may include instructions executable by the host network entity 706 to generate an operator account. In accordance with the instruction set, the host network entity 706 may generate the operator account (operation 736). The host network entity 706 may generate the operator account based on metadata in the digital certificate. For example, the metadata may contain the instruction set for generating the operator account.

Upon having generated the operator account, the host network entity 706 may terminate the first connection with the client network entity 704 (operation 738). To terminate the first connection, the host network entity 706 may close one or more sockets utilized for the first connection, effectively ending the pathway for data to flow between the client network entity and the host network entity 706. Additionally, the network entity may release one or more ports utilized for the first connection, making them available for other connections. In one example, the host network entity 706 may transmit a notification to the client network entity 704 indicating that the first connection is being terminated, for example, prior to terminating the first connection. Additionally, the host network entity 706 may transmit a notification to the client network entity 704 indicating that the operator account has been generated, for example, prior to terminating the first connection.

The client network entity 704 may utilize the operator user alias to establish a second connection with the host network entity 706 via the operator account (operation 740). In one example, in response to the first connection being terminated and/or the notification from the host network entity 706, the client network entity 704 may transmit a connection request to the host network entity 706 to connect to the host network entity via the operator account. The host network entity 706 may receive the connection request from the client network entity 704 via the provisioner user alias, and the host network entity 706 entity may establish the second connection with the client network entity 704 via the operator account. Upon having established the second connection via the operator account, the host network entity 706 may provide the client network entity 704 with access to the one or more target resources via the operator account (operation 742). The client network entity 704 may then access the one or more target resources available from the host network entity 706 via the operator user account. After accessing the one or more target resources, the second connection may be terminated.

In one example, the client network entity 704 may connect to the host network entity 706 via respectively different sockets and/or ports via the provisioner user alias and the operator user alias. In one example, the client network entity 704 may utilize a first set of sockets and/or ports to connect with the host network entity 706 via the provisioner account. In one example, the first set of sockets and/or ports may be configured for access to the host network entity 706 only for transmitting the digital certificate to the host network entity 706. Additionally, or in the alternative, the client network entity 704 may utilize a second set of sockets and/or ports to connect with the host network entity 706 via the operator account. In one example, the second set of sockets and/or ports may be configured for accessing the one or more target resources. The host network entity 706 may be configured to connect with the client network entity 704 via the provisioner account using the first set of sockets and/or ports, and to connect with the client network entity 704 via the operator account using the second set of sockets and/or ports. In one example, the host network entity 706 may determine which sockets and/or ports to utilize based on one or more access polices corresponding to the provisioner user alias and/or the operator user alias, as applicable.

Once an operator account has been generated by the host network entity 706, the client network entity 704 may still utilize the provisioner user alias to establish a connection with the network entity via the provisioner account prior to establishing a connection via the operator account. For example, upon having established a connection with the client network entity 704 via the provisioner account, the host network entity 706 may determine that an operator account exists for the client network entity 704 and that the operator account is valid. Responsive to determining that the operator account exists and is valid, the host network entity 706 may prompt the client network entity 704 to request a connection via the operator account, and responsive to the request, the host network entity 706 may establish a connection with the client network entity 704 via the operator account, thereby enabling the client to access one or more target resources available via the host network entity 706. The transition from the provisioner account to the operator account may be executed automatically, for example, by operations respectively performed by the host operations agent 632 (FIG. 6) and the client operations agent 634 (FIG. 6).

The operator account generated by the host network entity 706 may have an expiry. The host network entity 706 may terminate the operator account based on an account termination trigger, such as an expiry time, or a disconnection event. In one example, the host network entity 706 may generate an operator account for use by the client network entity 704 each time the client network entity 704 connects with the host network entity 706 to access the target resources, and the operator account may expire and/or may be terminated when the connection via the operator account is terminated.

6. Establishing Operator Account Connections

Figure 8:
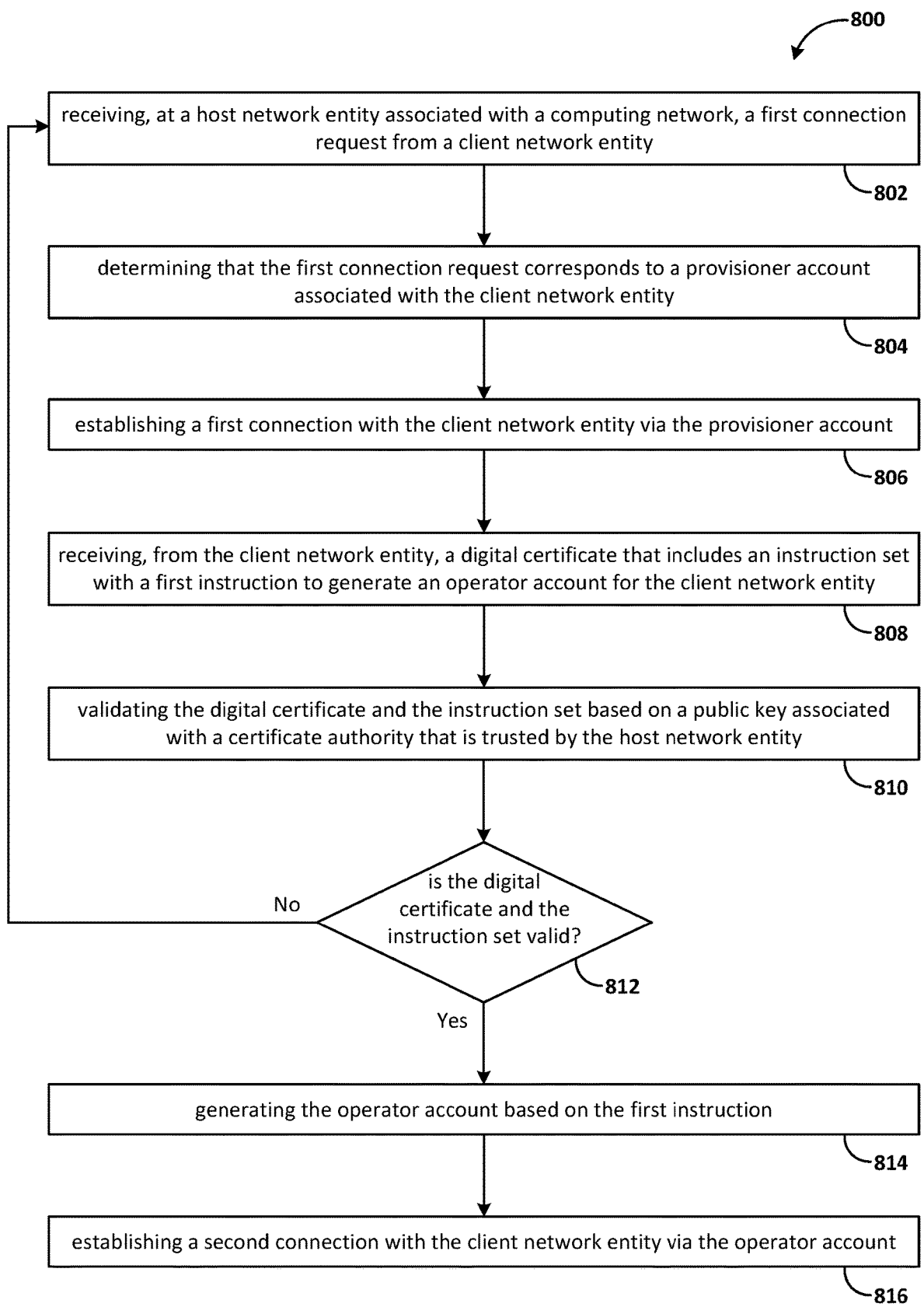
FIG. 8 is a flowchart that illustrates example operations pertaining to establishing operator account connections between a client network entity and a host network entity.

Referring now to FIG. 8, operations 800 pertaining to establishing an operator account connection between a host network entity and a client network entity are further described. One or more operations 800 described with reference to in FIG. 8 may be modified, combined, rearranged, or omitted all together. Accordingly, the particular sequence of operations 800 described with reference to FIG. 8 should not be construed as limiting the scope of one or more embodiments. In one example, the operations described with reference to FIG. 8 may include one or more operations 700 described with reference to FIG. 7.

As shown in FIG. 8, the operations 800 may include, at block 802, receiving, at a host network entity associated with a computing network, a first connection request from a client network entity. At block 804, the operations 800 may include determining that the first connection request corresponds to a provisioner account associated with the client network entity. At block 806, the operations 800 may include establishing a first connection with the client network entity via the provisioner account. At block 808, the operations 800 may include receiving, from the client network entity, a digital certificate via the first connection. The digital certificate may include an instruction set, and the instruction set may include a first instruction to generate an operator account for the client network entity.

At block 810, the operations 800 may include validating the digital certificate and the instruction set based at least in part on a public key associated with a certificate authority that is trusted by the host network entity. The instruction set may include a digital signature generated via a private key associated with the certificate authority, and the instruction set may be validated by decrypting the digital signature using a public key corresponding to the private key that is accessible by the host network entity. The private key and the public key may represent an asymmetric key pair associated with the certificate authority. Additionally, or in the alternative, the digital certificate may include a digital signature generated via the private key, and the digital certificate may be validated by decrypting the signature using the public key.

At block 812, the operations 800 may include determining whether the digital certificate and the instruction set are valid. The determination may be based on validating the digital certificate and the instruction set at block 810. For a determination that the digital certificate and the instruction set are valid, the operations may proceed to block 814. For a determination that the digital certificate or the instruction set is invalid, the first connection may be terminated, and the operations may return to block 802.

At block 814, responsive to validating the digital certificate and the instruction set, the operations 800 may include generating the operator account based on the first instruction. At block 816, the operations 800 may include establishing a second connection with the client network entity via the operator account. Upon having established the second connection via the operator account, the client network entity may access one or more target resources that may be available via the host network entity.

In one example, subsequent to generating the operator account at block 814, the operations may include terminating the first connection, and establishing the second connection at block 816. Terminating the first connection may include closing one or more first sockets used for the first connection and/or releasing one or more first ports used for the first connection. Establishing the second connection may include opening one or more second sockets and/or binding one or more second ports.

In one example, the operations may include sending a notification to the client network entity that the first connection is being terminated. Additionally, or in the alternative, subsequent to terminating the first connection, and/or subsequent to sending the notification to the client network entity, the operations may include receiving a second connection request from the client network entity, and establishing the second connection with the client network entity responsive to the second connection request.

In one example, the first connection may be terminated, subsequent to generating the operator account, in response to a trigger in the instruction set. When the first connection is terminated in response to a trigger, the operations may include detecting in the instruction set, a trigger to terminate the first connection upon having generated the operator account, and terminating the first connection responsive to detecting the trigger.

In one example, the operations 800 may include determining, based on the digital certificate, a first user principal corresponding to a provisioner user alias utilized by the client network entity with respect to the first connection, and determining a first access policy associated with the first user principal. The first access policy may be determined from an IAM system. Responsive to determining the first access policy, the operations 800 may include establishing the first connection with the client network entity in accordance with the first access policy. In one example, based on the first access policy, the one or more target resources may be inaccessible via the provisioner account.

Additionally, or in the alternative, the operation s800 may include determining, based on the digital certificate, a second user principal corresponding to an operator user alias utilized by the client network entity with respect to the second connection, and determining a second access policy associated with the second user principal. The second access policy may be determined from an IAM system. Responsive to determining the second access policy, the operations 800 may include establishing the second connection with the client network entity in accordance with the second access policy. In one example, based on the second access policy, the one or more target resources are accessible via the operator account.

7. Miscellaneous; Extensions

Embodiments are directed to a system with one or more devices that include a hardware processor and that are configured to perform any of the operations described herein and/or recited in any of the claims below. Embodiments are directed to a system including means to perform any of the operations described herein and/or recited in any of the claims below. In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

All references, including publications, patent applications, and patents, cited herein are hereby incorporated by reference to the same extent as if each reference were individually and specifically indicated to be incorporated by reference and were set forth in its entirety herein.

What is claimed is:

1. One or more non-transitory computer-readable media storing instructions, which when executed by one or more hardware processors, cause performance of operations comprising:
receiving, at a host network entity associated with a computing network, a first connection request from a client network entity;
determining that the first connection request corresponds to a provisioner account associated with the client network entity;
establishing a first connection with the client network entity via the provisioner account;
receiving, from the client network entity, a digital certificate via the first connection,
wherein the digital certificate comprises an instruction set, the instruction set comprising a first instruction to generate an operator account for the client network entity;
validating the digital certificate and the instruction set based at least in part on a public key associated with a certificate authority that is trusted by the host network entity;
responsive to validating the digital certificate and the instruction set, generating the operator account based on the first instruction;
establishing a second connection with the client network entity via the operator account;
wherein the client network entity utilizes the operator account to access at least one target resource.

2. The media of claim 1, wherein the operations further comprise:
determining, based on the digital certificate, a first user principal corresponding to a provisioner user alias utilized by the client network entity with respect to the first connection;
determining a first access policy associated with the first user principal; and
establishing the first connection with the client network entity in accordance with the first access policy;
wherein, based on the first access policy, the at least one target resource is inaccessible via the provisioner account.

3. The media of claim 2, wherein the operations further comprise:
determining, based on the digital certificate, a second user principal corresponding to an operator user alias utilized by the client network entity with respect to the second connection;
determining a second access policy associated with the second user principal; and
establishing the second connection with the client network entity in accordance with the second access policy;
wherein, based on the second access policy, the at least one target resource is accessible via the operator account.

4. The media of claim 1, wherein the operations further comprise:
subsequent to generating the operator account, terminating the first connection,
wherein terminating the first connection comprises at least one of:
closing one or more first sockets used for the first connection,
releasing one or more first ports used for the first connection, or
sending a notification to the client network entity that the first connection is being terminated;
wherein establishing the second connection comprises at least one of:
opening one or more second sockets, or
binding one or more second ports.

5. The media of claim 4, wherein the operations further comprise:
subsequent to generating the operator account:
detecting, in the instruction set, a trigger to terminate the first connection upon having generated the operator account; and
terminating the first connection responsive to detecting the trigger.

6. The media of claim 5, wherein the operations further comprise:
subsequent to terminating the first connection, receiving a second connection request from the client network entity; and
establishing the second connection with the client network entity responsive to the second connection request.

7. The media of claim 1,
wherein the digital certificate is issued to the client network entity by the certificate authority responsive to a certificate signing request,
wherein the certificate authority receives the certificate signing request, and responsive to the certificate signing request, the certificate authority performs a set of certificate provisioning operations, wherein the set of certificate provisioning operations comprise:
generating the instruction set;
generating a digital signature associated with the instruction set using a private key, wherein the private key corresponds to a public key accessible by the host network entity to validate the digital signature; and
generating the digital certificate comprising the instruction set.

8. A method, comprising:
receiving, at a host network entity associated with a computing network, a first connection request from a client network entity;
determining that the first connection request corresponds to a provisioner account associated with the client network entity;
establishing a first connection with the client network entity via the provisioner account;
receiving, from the client network entity, a digital certificate via the first connection,
wherein the digital certificate comprises an instruction set, the instruction set comprising a first instruction to generate an operator account for the client network entity;
validating the digital certificate and the instruction set based at least in part on a public key associated with a certificate authority that is trusted by the host network entity;
responsive to validating the digital certificate and the instruction set, generating the operator account based on the first instruction;
establishing a second connection with the client network entity via the operator account;
wherein the client network entity utilizes the operator account to access at least one target resource;
wherein the method is performed by at least one device including a hardware processor.

9. The method of claim 8, further comprising:
determining, based on the digital certificate, a first user principal corresponding to a provisioner user alias utilized by the client network entity with respect to the first connection;
determining a first access policy associated with the first user principal; and
establishing the first connection with the client network entity in accordance with the first access policy;
wherein, based on the first access policy, the at least one target resource is inaccessible via the provisioner account.

10. The method of claim 9, further comprising:
determining, based on the digital certificate, a second user principal corresponding to an operator user alias utilized by the client network entity with respect to the second connection;
determining a second access policy associated with the second user principal; and
establishing the second connection with the client network entity in accordance with the second access policy;
wherein, based on the second access policy, the at least one target resource is accessible via the operator account.

11. The method of claim 8, further comprising:
subsequent to generating the operator account, terminating the first connection,
wherein terminating the first connection comprises at least one of:
    closing one or more first sockets used for the first connection,
    releasing one or more first ports used for the first connection, or
    sending a notification to the client network entity that the first connection is being terminated;
wherein establishing the second connection comprises at least one of:
    opening one or more second sockets, or
    binding one or more second ports.

12. The method of claim 8, further comprising:
subsequent to generating the operator account:
    detecting, in the instruction set, a trigger to terminate the first connection upon having generated the operator account; and
    terminating the first connection responsive to detecting the trigger.

13. The method of claim 12, further comprising:
subsequent to terminating the first connection, receiving a second connection request from the client network entity; and
establishing the second connection with the client network entity responsive to the second connection request.

14. A system, comprising:
at least one hardware processor;
wherein the system is configured to execute operations, using the at least one hardware processor, the operations comprising:
    receiving, at a host network entity associated with a computing network, a first connection request from a client network entity;
    determining that the first connection request corresponds to a provisioner account associated with the client network entity;
    establishing a first connection with the client network entity via the provisioner account;
    receiving, from the client network entity, a digital certificate via the first connection,
        wherein the digital certificate comprises an instruction set, the instruction set comprising a first instruction to generate an operator account for the client network entity;
    validating the digital certificate and the instruction set based at least in part on a public key associated with a certificate authority that is trusted by the host network entity;
    responsive to validating the digital certificate and the instruction set, generating the operator account based on the first instruction;
    establishing a second connection with the client network entity via the operator account;
wherein the client network entity utilizes the operator account to access at least one target resource.

15. The system of claim 14, wherein the operations further comprise:
determining, based on the digital certificate, a first user principal corresponding to a provisioner user alias utilized by the client network entity with respect to the first connection;
determining a first access policy associated with the first user principal; and
establishing the first connection with the client network entity in accordance with the first access policy;
wherein, based on the first access policy, the at least one target resource is inaccessible via the provisioner account.

16. The system of claim 15, wherein the operations further comprise:
determining, based on the digital certificate, a second user principal corresponding to an operator user alias utilized by the client network entity with respect to the second connection;
determining a second access policy associated with the second user principal; and
establishing the second connection with the client network entity in accordance with the second access policy;
wherein, based on the second access policy, the at least one target resource is accessible via the operator account.

17. The system of claim 14, wherein the operations further comprise:
subsequent to generating the operator account, terminating the first connection,
wherein terminating the first connection comprises at least one of:
    closing one or more first sockets used for the first connection,
    releasing one or more first ports used for the first connection, or
    sending a notification to the client network entity that the first connection is being terminated;
wherein establishing the second connection comprises at least one of:
    opening one or more second sockets, or
    binding one or more second ports.

18. The system of claim 14, wherein the operations further comprise:
subsequent to generating the operator account:
    detecting, in the instruction set, a trigger to terminate the first connection upon having generated the operator account; and terminating the first connection responsive to detecting the trigger.

19. The system of claim 18, wherein the operations further comprise:

subsequent to terminating the first connection, receiving a second connection request from the client network entity; and establishing the second connection with the client network entity responsive to the second connection request.

20. The system of claim 14, wherein the digital certificate is issued to the client network entity by the certificate authority responsive to a certificate signing request, wherein the certificate authority receives the certificate signing request, and responsive to the certificate signing request, the certificate authority performs a set of certificate provisioning operations, wherein the set of certificate provisioning operations comprise:

generating the instruction set;

generating a digital signature associated with the instruction set using a private key, wherein the private key corresponds to a public key accessible by the host network entity to validate the digital signature; and generating the digital certificate comprising the instruction set.

\* \* \* \* \*